(12) United States Patent
Qadeer

(10) Patent No.: US 6,892,319 B2
(45) Date of Patent: May 10, 2005

(54) METHOD FOR VERIFYING ABSTRACT MEMORY MODELS OF SHARED MEMORY MULTIPROCESSORS

(75) Inventor: Shaz Qadeer, San Francisco, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 580 days.

(21) Appl. No.: 09/949,324

(22) Filed: Sep. 7, 2001

(65) Prior Publication Data

US 2002/0166032 A1 Nov. 7, 2002

Related U.S. Application Data

(60) Provisional application No. 60/231,036, filed on Sep. 8, 2000.

(51) Int. Cl.$^7$ ............................................... G06F 11/00
(52) U.S. Cl. ........................... 714/10; 714/42; 714/718; 716/4
(58) Field of Search ............................. 714/10, 41, 42, 714/718; 716/4

(56) References Cited

U.S. PATENT DOCUMENTS

| | | | | |
|---|---|---|---|---|
| 5,406,504 A | * | 4/1995 | Denisco et al. | ............. 702/117 |
| 5,958,072 A | * | 9/1999 | Jacobs et al. | ................. 714/30 |
| 6,446,241 B1 | * | 9/2002 | Mobley et al. | ................ 716/4 |
| 6,539,503 B1 | * | 3/2003 | Walker | ....................... 714/703 |
| 6,651,228 B1 | * | 11/2003 | Narain et al. | .................. 716/5 |
| 6,654,715 B1 | * | 11/2003 | Iwashita | ...................... 703/22 |

OTHER PUBLICATIONS

Henzinger, Thomas et al. Verifying Sequential Consistency on Shared–memory Multiprocessor Systems.http://www-cad.eecs.berkeley.edu/~tah/Publications/verifying_sequential_consistency_for_multiprocessor_memory_protocols.pdf.*

Qadeer, Shaz Verifying Sequential Consistency on Shared-Memory Multiprocessors by Model Checking. www.ieeexplore.com.*

Condon, Anne et al. Automatable Verification of Sequential Consistency. www.acm.org.*

Qadeer, Shaz Algorithms and Methodology for Scalable Model Checking. research.microsoft.com/~qadeer/docs/thesis–pdf.pd.*

* cited by examiner

*Primary Examiner*—Robert Beausoliel
*Assistant Examiner*—Yolanda L Wilson

(57) ABSTRACT

A method of verifying a protocol for a shared-memory multiprocessor system for sequential consistency. In the system there are n processors and m memory locations that are shared by the processors. A protocol automaton, such as a cache coherence protocol automaton, is developed. The protocol automaton and a plurality of checker automata are provided to a model checker which exhaustively searches the state space of the protocol automaton. During the search, the plurality of checker automata check for the presence of cycles in a graph that is the union of the total orders of the processor references and the partial orders at each memory location. If the plurality of checker automata detect the presence of a cycle, then the protocol does not meet the sequential consistency requirement.

10 Claims, 19 Drawing Sheets

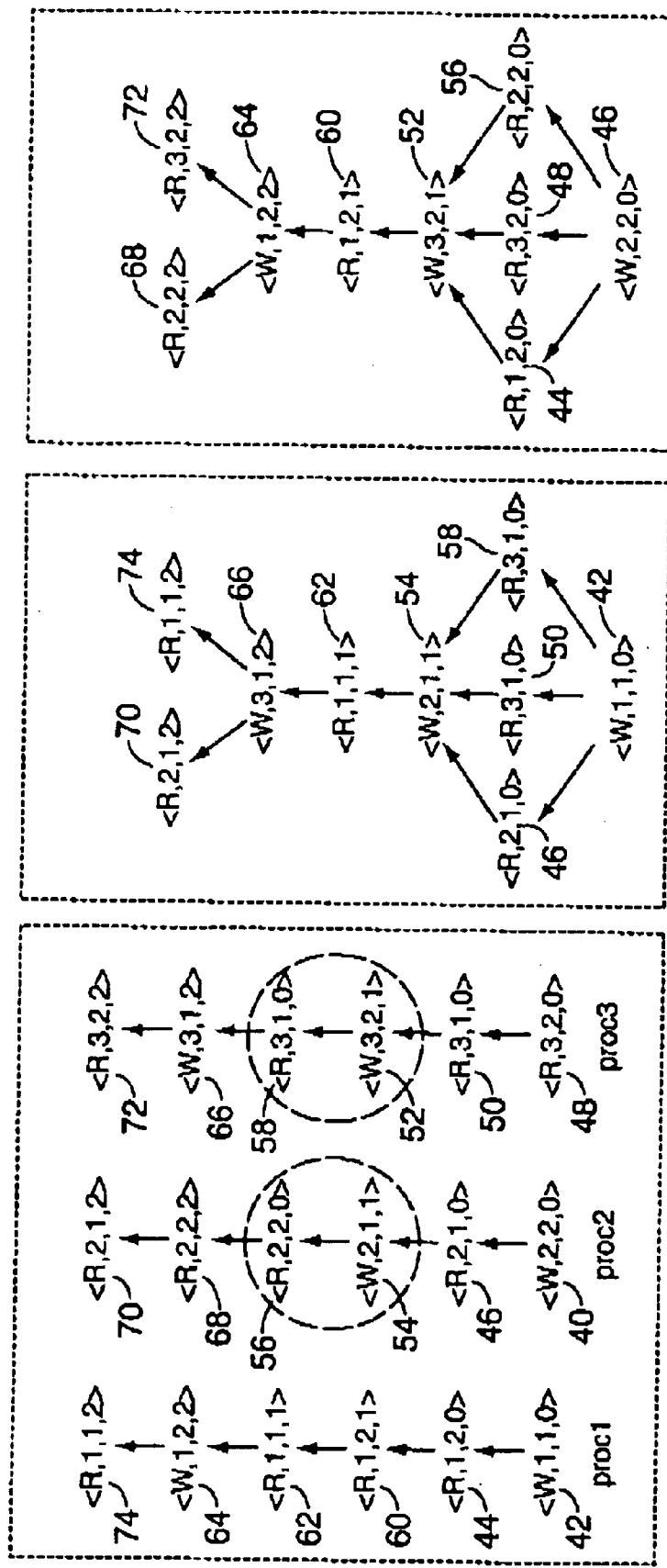

<op, proc, loc, data> = <R|W, 1|2|3, 1|2, 0|1|2> canonical 2-nice cycle

<op, proc, loc, data> = <R|W, 1|2|3, 1|2, 0|1|2>

```
typedef Msg {m : {ACKS, ACKX},a : N_m,d: N⁺_v}∪{m : {INVAL},a : N_m};
typedef CacheEntry {d : N⁺_v, s : {INV, SHD, EXC}};
cache : array N_n of array N_m of CacheEntry;
inQ : array N_n of Queue(Msg);
owner : array N_m of N⁺_n;

Initial predicate
∀i ∈ N_n, j ∈ N_m: (cache[i][j] = (0, SHD) ∧ inQ[i].empty ∧ owner[j] ≠ 0)
Events
<R,i,j, k>    cache[i][j].s ≠ INV ∧ cache [i][j].d = k →
<W,i,j,k>     cache[i][j].s = EXC →
              cache[i][j].d := k
<ACKX,i,j> cache[i][j].s ≠ EXC ∧ owner[j] ≠ 0 →
              if owner[j] ≠ i then cache[owner[j]][j].s := INV;
              owner[j] := 0;
              for each (p ∈ N_n)
                   if (p=i) then
                       inQ[p] := append(inQ [p], <ACKX, j, cache[owner[j]][j].d>)
                   else if (p ≠ owner[j] ∧ cache[p][j].s ≠ INV) then
                       inQ[p] := append(inQ[p], (INVAL, j))
<ACKS, i, j>  cache [i][j].s = INV ∧ owner[j] ≠ 0 →
              cache[owner[j]][j].s := SHD;
              owner[j] := 0;
              inQ[i] := append(inQ[i], <ACKS, j, cache[owner[j]][j].d>);
<UPD, i>   ¬empty inQ[i] →
              let msg = head(inQ[i]) in
                   if (msg.m = INVAL) then
                       cache[i][msg.a].s := INV
                   else if (msg.m = ACKS) then {
                       cache[i][msg.a] := (SHD, msg.d);
                       owner[msg.a] := i
                   } else }
                       cache[i][msg.a] := (EXC, msg.d);
                       owner[msg.a] := i
                   }
              inQ[i] : = tail(inQ[i])
```

FIG. 11

Automation $Constrain_k(j)$ for $1 \leq j \leq k$
States $\{a, b\}$
Initial State $a$
Accepting states $\{a, b\}$
Alphabet $E(n, m, 2)$
Transitions
$\neg(op(e) = W \wedge loc(e) = j) \rightarrow s' = s$
$s = a \wedge op(e) = W \wedge loc(e) = j \wedge data(e) = 0 \rightarrow s' = a$
$s = a \wedge op(e) = W \wedge loc(e) = j \wedge data(e) = 1 \rightarrow s' = b$
$s = b \wedge op(e) = W \wedge loc(e) = j \wedge data(e) = 2 \rightarrow s' = b$ Automation $Constrain_k(j)$ for $k < j \leq m$
States $\{a\}$
Initial state $a$
Accepting states $\{a\}$
Alphabet $E(n, m, 2)$
Transitions
$\neg(op(e) = W \wedge loc(e) = j) \rightarrow s' = s$
$s = a \wedge op(e) = W \wedge loc(e) = j \wedge data(e) = 0 \rightarrow s' = a$

FIG. 13A

Automaton $ProcessorChecker_k(i)$
States $\{a, b, err\}$
Initial State $a$
Accepting states $\{err\}$
Alphabet $E(n, m, 2)$
Transitions
$s = a \wedge proc(e) = i \wedge loc(e) = i \wedge data(e) \in \{1,2\} \rightarrow s' = b$
$s = b \wedge proc(e) = i) \wedge (loc(e) = i \oplus_k 1) \wedge (data(e) = 0 \vee (op(e) = W \wedge data(e) = 1)) \rightarrow s' = err$
$default \rightarrow s' = s$

FIG. 13B

METHOD FOR VERIFYING ABSTRACT MEMORY MODELS OF SHARED MEMORY MULTIPROCESSORS

CROSS-REFERENCE TO RELATED APPLICATIONS

This application claims priority to U.S. Provisional Application entitled "METHOD FOR VERIFYING ABSTRACT MEMORY MODELS OF SHARED MEMORY MULTIPROCESSORS", Ser. No. 60/231,036, filed on Sep. 8, 2000, which application is hereby incorporated by reference into the present application.

FIELD OF THE INVENTION

The invention disclosed herein generally relates to the verification of protocols and more specifically, to verifying the correctness of a cache coherence protocol in a multiprocessor computer system by means of a model checker.

DESCRIPTION OF THE RELATED ART

FIG. 1 shows a system 8 which serves to illustrate a system environment in which a protocol, that is verifiable by the present invention, operates. The system 8 includes a plurality n of processors 10, 12, 14, which each access a shared memory 16 having m locations via a system bus 18. The caches 20, 22, 24 indicated by the dotted lines are considered absent for the present discussion. The system bus 18 has the property that only one processor at a time is allowed access to the bus and therefore to the shared memory. Thus, the bus 18 has the effect of serializing the accesses of the processors to the shared memory. Another property of a system bus 18, such as the one shown in FIG. 1, is that the result of a memory access is observable by each processor 10, 12, 14 in the system at the same time. This later property is sometimes termed the "atomicity of memory accesses." From these properties, an ordering rule regarding loads and store can be derived. A load to a memory location must return the latest value stored at that location. If no store has occurred at a location, the load must return the initial value of the location. It is convenient in what follows herein to assume that the initial value of each location is zero.

Additionally, a system is "strongly ordered" if memory accesses of a processor are performed in the order dictated by the program on that processor. This means that the logical ordering of reads and writes with respect to a particular processor in the system is not altered by the presence of memory events caused by other processors in the system. The memory events of the processors in the system can be interleaved in some manner on the system bus but this interleaving cannot reorder the memory accesses with respect to a particular processor.

If a system has both atomic memory accesses and is strongly ordered, the system is said to be "sequentially consistent." In a "sequentially consistent system," the parallel execution of programs on the plurality of processors is equivalent to some interleaved execution of those programs on a uniprocessor system and it is believed that such a system will always function correctly, assuming, of course, that the individual programs on the processors have no errors. Though a strongly ordered system with atomic memory accesses is guaranteed to function "correctly," systems that have a weak ordering of memory events can also function correctly. Weakly ordered systems require the addition of synchronization points (synchronization memory accesses) to the programs executing on the plurality of processors and these synchronization points must either be sequentially consistent or at least processor consistent. Thus, the strongly-ordered model is still important and applicable to these systems and though a strongly-ordered system is used to illustrate the present invention, the present invention is not limited to such strongly-ordered systems.

In the system of FIG. 1, if caches 20, 22, 24 are added for each processor 10, 12, 14 respectively, then the system 8 loses the property that the memory accesses by the processors are atomic. For example, if a particular processor 10 performs a store at a memory location that is cached in that processor's cache, the other processors 12, 14 are unaware of the change to the contents of that memory location. If one of the other processors 12, 14 performs a load of that memory location, that other processor may receive the unchanged data value at that location, which can lead to erroneous processing on that processor. Thus, it is necessary to restore the property of atomic memory accesses to a system with caches.

A cache coherence protocol meets this need. The job of a cache coherence protocol is to assure, in effect, that each cache entry, i.e., each cache line which is the unit of activity for coherency purposes, has the most recent value. If the protocol does not meet this requirement, then stale data is returned to one of the processors at some point in the execution of its program and that processor's program fails and the entire system possibly fails.

However, the design of a cache coherence protocol is a difficult and complex process. Not only must the protocol be efficient to assure the commercial viability of the systems in which they are implemented, but the protocol must also be correct under all possible sequences of memory events in the system. Commonly, in a cache coherence protocol, each line of each of the n caches in the system includes information about the line, such as a tag that indicates the memory location for the line, whether the line is shared by other processors, or whether the line is the only correct copy. A cache coherence protocol uses the information about the line to implement the protocol. If the line information includes four states and there are m lines in a cache, the number of possible states in the cache is $4^m$, which can be a very large number even for small cache sizes. If there are n processors, the number of states in the system increases to $4^{mn}$, an even larger number. In the system shown in FIG. 1, with three processors, two memory locations and four possible cache line states, there are 16 ($4^2$) states possible in each cache and 4096 ($16^3$) possible states in the system. In a real system having even more states, if only one erroneous combination occurs among the possible states of the system, then the system will eventually fail and the reason for the failure may be nearly impossible to determine.

It is therefore of the utmost importance to assure that the cache coherence protocol is correct, which, in one implementation, means that the system is sequentially consistent, so that a system implemented with such a protocol cannot not fail.

BRIEF SUMMARY OF THE INVENTION

The present invention is directed towards the above need. A method in accordance with the present invention includes a method of verifying, for a computing system having a plurality of processors and a memory having a plurality of locations being shared by each of the plurality of processors, a protocol for sequential consistency. The method includes the steps of providing an executable description of an automaton for the protocol to be verified, providing an executable description of a constrain automaton and an executable description of a processor checking automaton, where the processor checking automaton has an error state and is configured to detect the presence of a cycle of a given size in a graph. The graph is a union of partial orderings of memory events at the shared memory locations and of total orderings of the memory events at the processors, and a cycle is present in the graph if the error state is reached the processor checking automaton. The method further includes the steps of submitting the protocol automaton, the processor checking automaton and the constrain automaton to a model checker, running the model checker to reach a set of states of the protocol automaton that are permitted by the constrain automaton and, during the running of the model checker, determining whether the processor checker automaton has reached its error state. If the processor checker automaton has reached its error state, an indication is provided that there is a sequential consistency error in the protocol automaton.

One advantage of the present invention is that a cache coherence protocol can be thoroughly verified so that systems designed with a verified protocol cannot fail due to a protocol error.

Another advantage of the present invention is that the number of states to be checked by the model checker is kept at a minimum to reduce the processing time required to verify the protocol.

Yet another advantage is that a variety of different cache coherence protocols can be verified by designing checker automata that look for properties such as cycles or starvation of a processor, in the graph of the union of the partial orders on the memory locations and total orders on the processors.

BRIEF DESCRIPTION OF THE DRAWINGS

These and other features, aspects and advantages of the present invention will become better understood with regard to the following description, appended claims, and accompanying drawings where:

FIG. 5 shows a total order of the memory events at each of the three processors in FIG. 2 caused by program executing on each processor shown in FIG. 1;

FIGS. 6A and 6B show a partial order of the read and write memory events relating to the memory locations of the memory in the system setting;

FIG. 11 shows a language statement of the cache coherence protocol of FIG. 10;

FIG. 13A shows a language description of the constrain automata of FIGS. 12A and 12B;

FIG. 13B shows a language description of processor checking automata for the canonical 2-nice cycle of FIG. 8B.

DETAILED DESCRIPTION OF THE INVENTION

Figure 1:
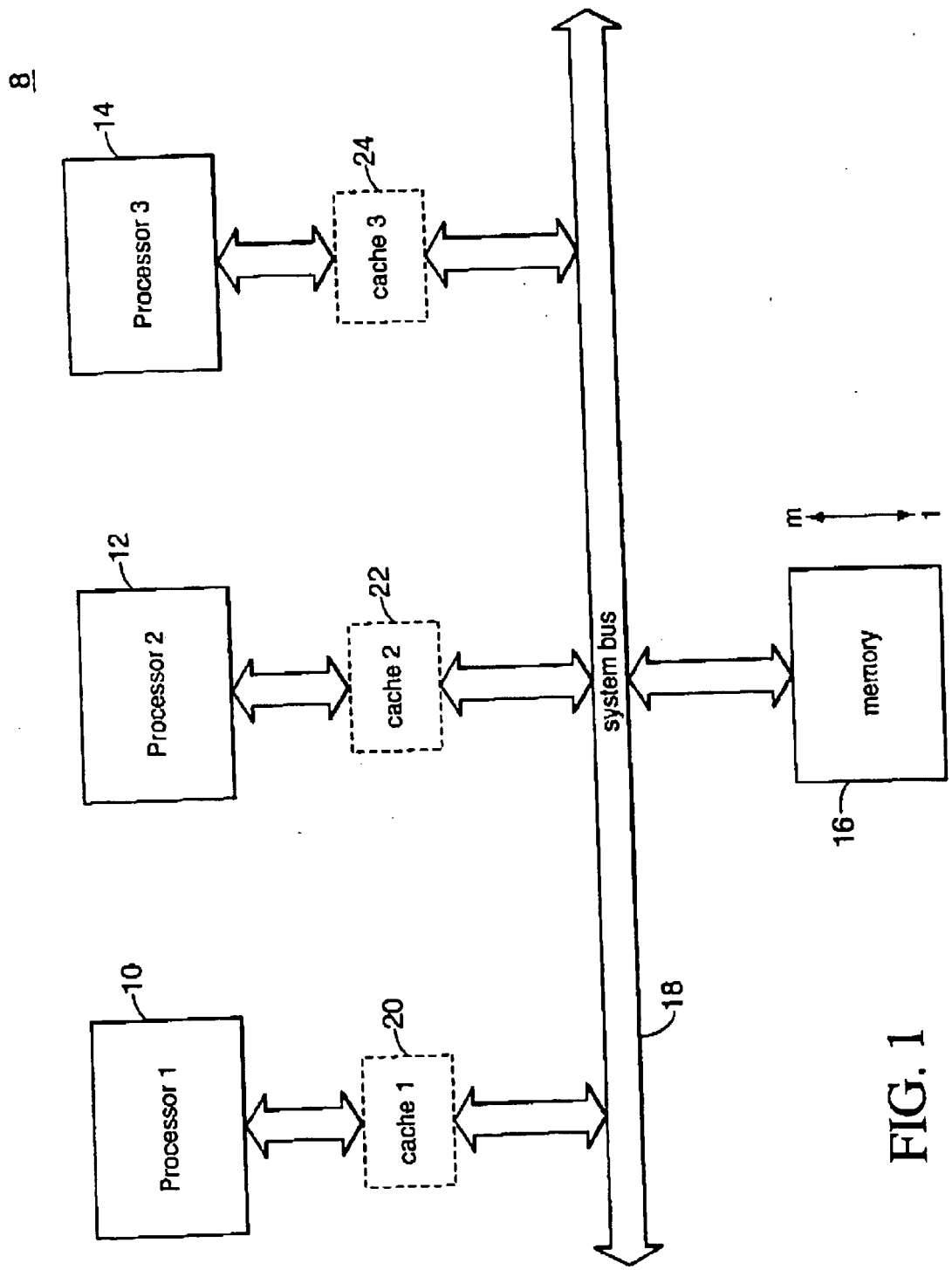
FIG. 1 shows a system setting which serves to illustrate a system environment in which a protocol, that is verifiable by the present invention, operates.
Figure 2:
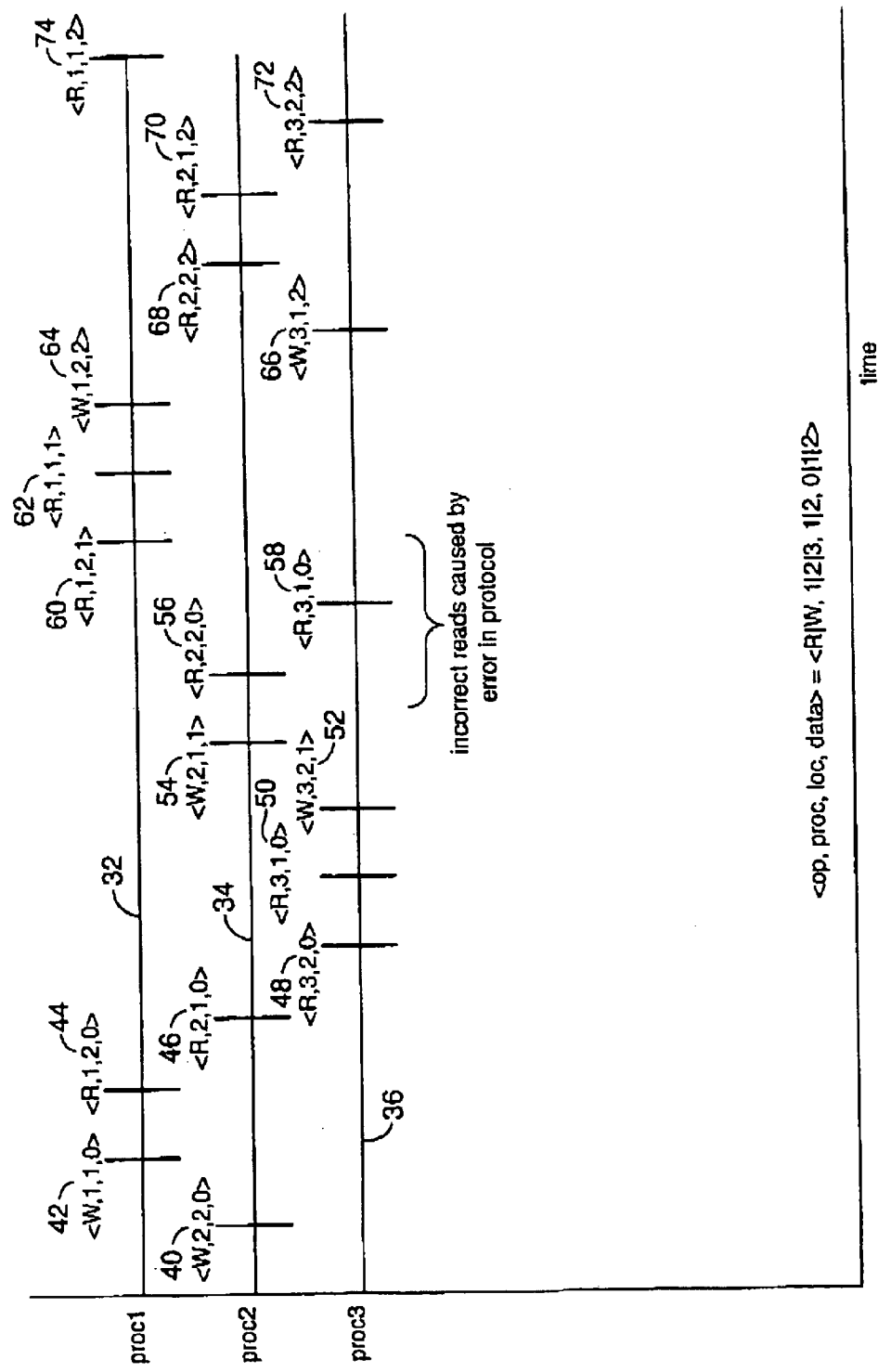
FIG. 2 shows a Gantt chart of memory events at each of three processors.

FIG. 2 shows a Gantt chart of memory events at each of three processors, such as those shown in FIG. 1. The sequence of all the memory events shown in FIG. 2 is called a run σ, which in this case contains 18 events 40–74. Each horizontal line 32, 34, 36 in the chart represents the set of memory events of a particular processor for the run. This set is designated P(σ, i), where i takes on values between 1 and n, where n is the total number of processors. Thus, the top line shows P(σ, 1), the middle line shows P(σ, 2), and the bottom line shows P(σ, 3).

Memory events of a particular processor are shown in their time order at the processor, with each hash line representing either a read or write operation to a memory location. In the example shown, m=2, so that there are two memory locations, designated 1 and 2. The notation next to each hash line indicates, by an ordered tuple, the event. For example, at processor 1, i.e., proc1, the first memory event is <W,1,1,0>. This tuple indicates that a write W occurs, by processor 1, at location 1, with data value 0. Next is the event <R,1,2,0> which indicates a read R occurs, by processor 1, from location 2, with data value 0. Thus, the format of the tuple is <op, proc, loc, data>, where op is either R or W, proc is the processor number, 1, 2, or 3, loc is the location number, 1 or 2, and data is the data value, which is constrained to 0, 1, or 2. There are two memory read events 56, 58 that are incorrect, reflecting that an error in sequential consistency has occurred.

Figure 3:
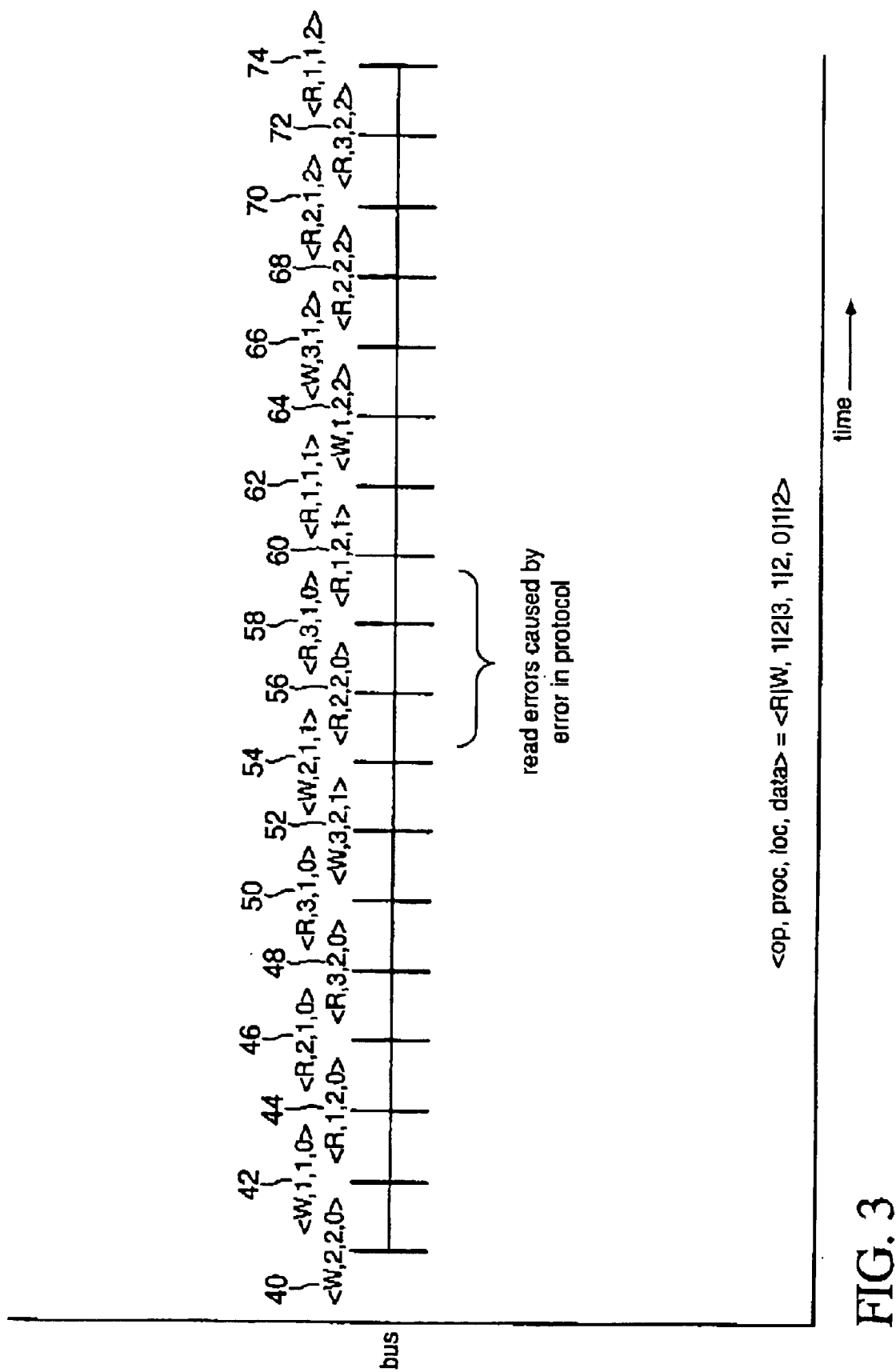
FIG. 3 shows a Gantt chart of the memory events on the bus in the system of FIG. 1.

FIG. 3 shows a Gantt chart of the memory events 40–74 of the run σ as serialized by the bus 18 in the system of FIG. 1. The same notation is used. It should be noted that only the memory events are shown in FIG. 3, though in fact, if the system of FIG. 1 includes caches, other bus events are present (not shown) to implement a particular cache coherence protocol. Such events may include invalidation events by which a line in a caches is invalidated because another cache modified the line, update events by which a line in a cache is updated with the most recent copy of the line or sharing events by which a line is copied from one cache to another cache. These events are intermingled among the memory read and write events and ultimately affect the correctness of the memory reads and writes.

Figure 4:
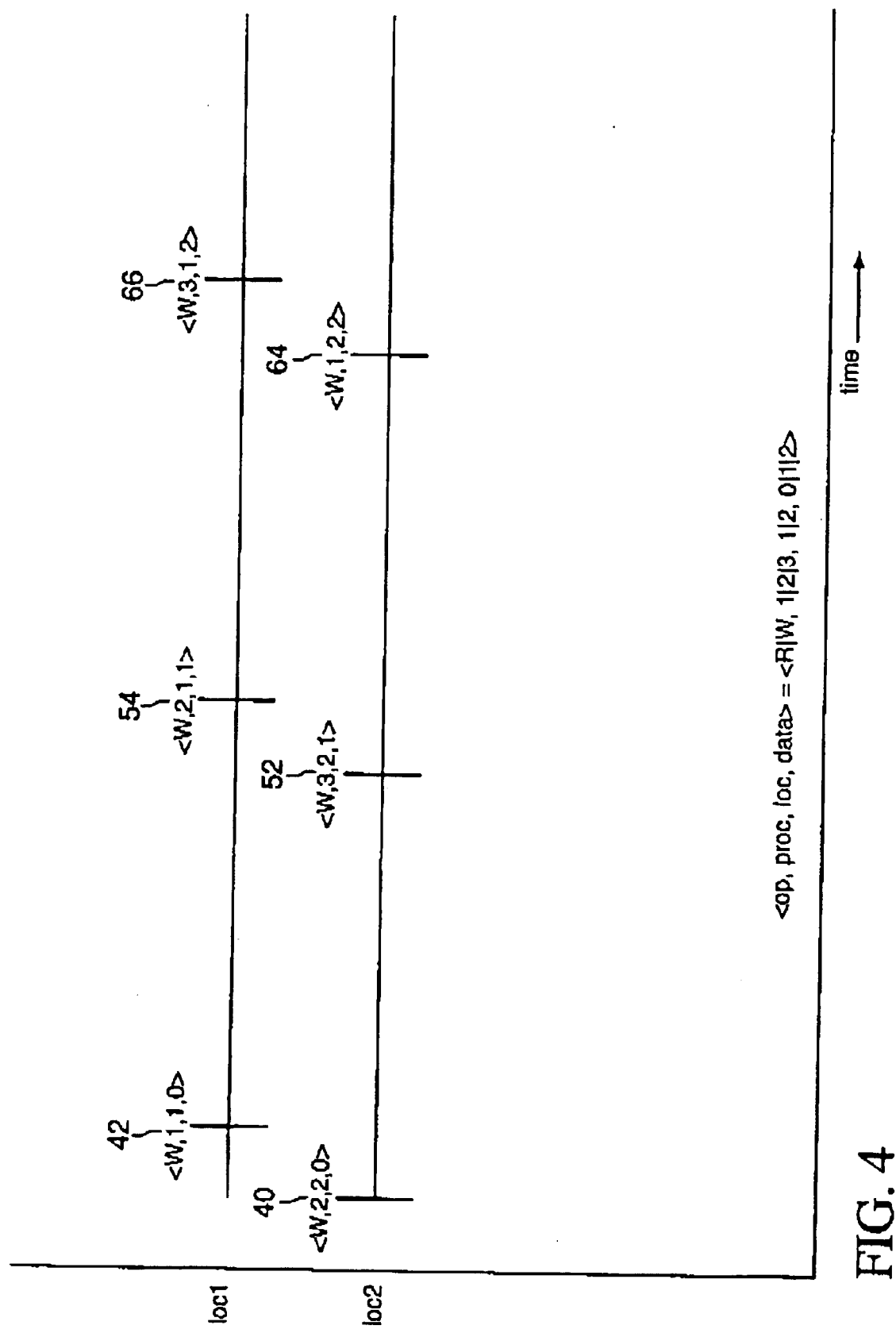
FIG. 4 shows a Gantt chart of the memory write events at the memory locations of the memory of FIG. 1 assuming a serializing agent such as the bus of FIG. 1 and FIG. 3.

FIG. 4 shows a Gantt chart of the write events 40, 42, 52, 54, 64, 66 at the memory locations of the memory of FIG.

1, assuming a serializing agent such as the bus 18 of FIG. 1 and FIG. 3. The set of all memory events at a particular location i for the run, where i takes on values between 1 and m, where m is the maximum number of memory locations, is designated L(σ, i). The set of write events to a particular location i is indicated by $L^w$(σ, i). The set of read events to a particular location i is indicated by $L^r$(σ, i). FIG. 4 shows the set of write events for location 1, $L^w$(σ, 1) 42, 54, 66, and location 2, $L^w$(σ, 2) 40, 52, 64 for the run shown in FIG. 3. The set of write events $L^w$(σ, 1), $L^w$(σ, 2) serves to help organize the set of read events, $L^r$(σ, 1) 46, 50, 58, 62, 70, 74, $L^r$(σ, 2) 44, 48, 56, 60, 68, 72 that occur to these memory locations for the given run. A read event to a location returning data value v must occur sometime after a write event with data value v to that location <W,−,i,v> and sometime before a write event with data value v+1 <W,−,i, v+1>, where a "−" in the processor position of the tuple indicates that the processor number is not relevant, i.e., a don't care.

FIG. 5 shows a total order of the memory events in FIG. 2 for a particular processor caused by the program executing on a processor shown in FIG. 1. A total order of events is a linear ordering of the events also called a chain of events. The memory events at a processor form a total order to meet the requirement that these events occur in the order prescribed by the program at the processor. The left most total order of memory events 42, 44, 60, 62, 64, 74 relates to processor 1's activity. The middle total order 40, 46, 54, 56, 68, 70 is the order for processor 2's memory events and the right most total order 48, 50, 52, 58, 66, 72 of memory events relates to processor 3. A processor total order is denoted M(σ,i) and thus FIG. 5 shows M(σ,1), M(σ,2) and M(σ,3) for the run.

FIGS. 6A and 6B shows the partial ordering of activity of FIG. 4 relating to the memory locations of the memory in the system setting. FIG. 6A is the partial ordering of events 42, 40, 50, 58, 54, 62, 66, 70, 74 for location 1 and FIG. 6B is the partial ordering of events 46, 44, 48, 56, 52, 60, 64, 68, 72 for location 2. These graphs are partial orders because, as far as the memory location is concerned, the order of reads between writes at a location is arbitrary. For example, in FIG. 6A, the order of the events <R,2,1,0> 46, <R,3,1,0> 50 and <R,3,1,0> 58 relative to each other is arbitrary. The only order that must be maintained is that the write events, <W,1,1,0> 42 <W,2,1,1> 54, be totally ordered and that these read events occur after the <W,1,1,0> 42 event and before the <W,2,1,1> 54 event. Also, the ordering of the events in this graph is based on the relation between data values. A read to location 1 that returns a data value of 0 must occur after the write of that value and before a write to that location which changes the value. The partial order of memory events at location i for the run is designated $Ω^e$(σ,i). Thus, FIG. 6A shows the partial order $Ω^e$(σ,1) and FIG. 6B shows partial order $Ω^e$(σ,2). Without the reads included, there would be a total order of memory events at each memory location. The total order of memory write events is denoted Ω(σ,i) for location i for the run σ.

It should be noted here that relations among data values used to order the reads in the partial order graph for memory locations rest on two assumptions. The first assumption is that the protocol is data independent. This means that data moving around in the protocol does not affect control decisions in the protocol. Therefore, all write events can have distinct data values. Furthermore, read events can be identified with write events by comparing the data values. The second assumption is the causality assumption which states that read data must arise from either the initialization data value or data from a previous write event. Both assumptions are reasonable for a wide range of protocols including cache coherence protocols.

Figure 7:
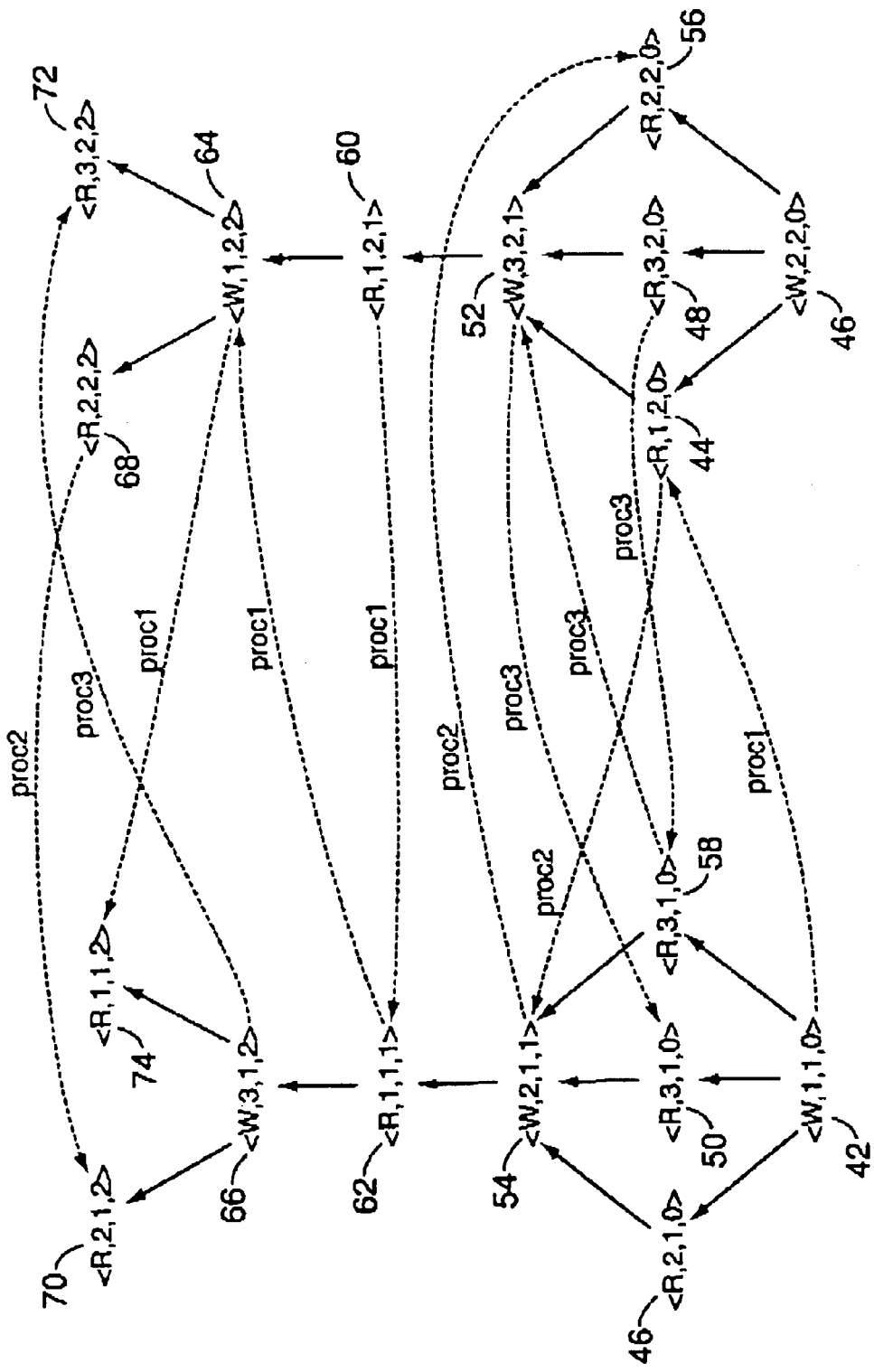
FIG. 7 shows a graph which is the union of the total order of events at each processor and the partial order of events for each memory location.

FIG. 7 shows a graph which is the union of the total orders of the processors and the partial orders at the memory locations. This is denoted G(M, Ω) for the run σ. Symbolically, $G(M,Ω) = \bigcup_{1 \le i \le n} M(σ,i) \cup \bigcup_{1 \le j \le m} Ω^e(σ,j)$ for the given run. In the example presented, five ordered graphs, m+n, that are combined into G(M,Ω). Such a graph represents the combined constraints of the processor ordering of events and the memory ordering of events for the graphs of FIGS. 5, 6A and 6B (without the redundant transitive orderings). Inspection of the graph G shows that there is a cycle among the memory events <R,3,1,0> 50, <W,2,1,1> 54, <R,2,2,0> 56 and <W,3,2,1> 52.

Figure 8A:
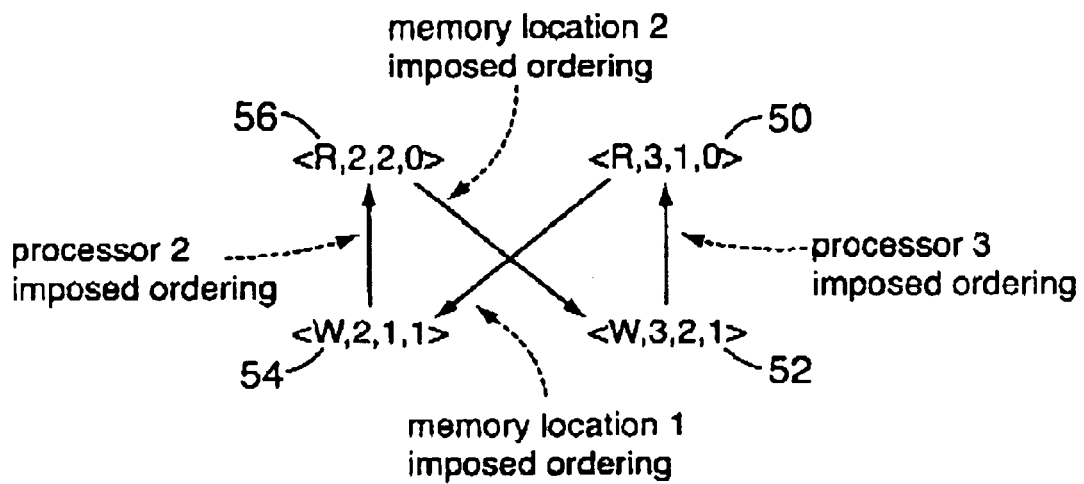
FIG. 8A shows a 2-nice cycle in the graph of FIG. 7, where the cycle represents a violation of sequential consistency for the system of FIG. 1, leading to at least an error or a system crash.

This cycle is more clearly shown in FIG. 8A. The cycle of FIG. 8A is called a 2-nice cycle because the cycle involves two different processors and two different memory locations and adjacent events in the cycle alternate between processor or location. The locations alternate between events <W,2,1,1> 54 and <R,2,2,0> 56 and between events <W,3,2,1> 52 and <R,3,1,0> 50 and the processors alternate between events <R,2,2,0> 56 and <W,3,2,1> 52 and between events <R,3,1,0> 50 and <W,2,1,1> 54. In general, a graph, such as shown in FIG. 7, may have a more complex cycle than the cycle shown in the figure. However, it can be proved that if a graph has a cycle, then it has a k-nice cycle where k ≤ min({n, m}).

In the example presented herein, k for a k-nice cycle takes on the possible values, 1 and 2, because m=2 and n=3 and what is shown in FIG. 8A is a 2-nice cycle with four edges. In general, a nice cycle has at most 2×min({n, m}) edges and a k-nice cycle has 2×k edges. The edge between events <W,2,1,1> and <R,2,2,0> is imposed by ordering of events at processor 2. The edge between events <W,3,2,1> and <R,3,1,0> is imposed by the ordering of events at processor 3. The edge between events <R,2,2,0> and <W,3,2,1> is imposed by the ordering of events at memory location 2 and the edge between events <R,3,1,0> and <W,2,1,1> is imposed by the ordering of events at memory location 1.

Figure 8B:
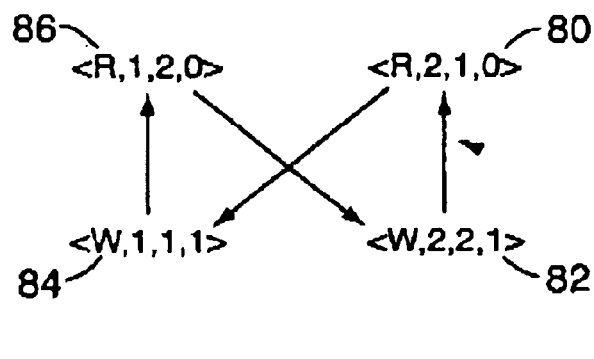
FIG. 8B shows a canonical 2-nice cycle derived from the 2-nice cycle in FIG. 8A.

FIG. 8B shows a canonical 2-nice cycle 82, 80, 84, 86 derived from the 2-nice cycle in FIG. 8A. The cycle shown includes events involving only processor 1 and processor 2 and location 1 and location 2, i.e., <W,1,1,1> 84, <R,1,2,0> 86, <W,2,2,1> 82, <R,2,1,0> 80. A canonical nice cycle is based on the assumption that there is symmetry in the system with respect to processors and memory locations. If such is the case, then the cycle that is shown in FIG. 8A which involves processors 2 and 3 can be converted to the cycle shown in FIG. 8B, which involves only processors 1 and 2 and locations 1 and 2. A canonical nice-cycle of a given size simplifies the job of cycle detection, because the edges in a non-canonical nice cycle, which can potentially occur in any order, imply a canonical nice cycle in which the edges are arranged in a canonical order. With the edges so arranged, few automata are required to detect the existence of the nice cycle. In fact an entire class of nice cycles is detected by detecting the canonical nice cycle.

The cycle shown in FIG. 7 and FIG. 8 stems from the incorrect reads shown in FIG. 2. More generally, it can be shown that if there is a cycle in a graph G such as in FIG. 7, then the system is not sequentially consistent. In terms of the graph G, if there is a cycle, there is no linearization of memory events in the run that satisfies the partial order M for all of the processors such that every read event return the data value of the last (according to the linearization) write event. In particular, returning to FIG. 2, it is easy to see that memory events at processor 2 and processor 3 cannot be linearized while at the same time satisfying the ordering of events at the memory locations in accordance with the data values. Processor 2 imposes the order <W,2,1,1> 54→<R, 2,2,0> 56. As shown in FIG. 8A, processor 3 imposes the order <W,3,2,1> 52→<R,3,1,0> 50. These events could be put into a chain <W,3,2,1>→<W,2,1,1>→<R,2,2,0>→<R, 3,1,0>. However, the requirement that the read events return the data value of the last write event is not satisfied in this chain. The ordering of the events at the memory locations imposes the condition that every read event return the data value of the last write event for each location. The imposition of this condition forces the read events to be ordered before the write event to the same location, thereby creating a cycle in a graph G that combines both orderings, $M(\sigma,i)$ and $\Omega^e(\sigma,j)$, for the given run. Therefore, the system having the memory events depicted in FIG. 2 is sequentially inconsistent and will eventually fail. If such a system having the memory events of FIG. 2, includes caches for each processor, then the cache coherence protocol has an error, because it is not sequentially consistent. It should be noted that the error in the cache coherence protocol is not in the read events <R,3,1,0> 50 and <R,2,2,0> 56 themselves, but in other activity, such as missing invalidate events on the bus, that should have occurred as part of the protocol, as discussed below. That other protocol-related activity eventually leads to the read errors.

The graph G of FIG. 7 then presents a convenient way, by simply detecting the k-nice cycles present, to spot errors in a cache coherence protocol. However, the graph G of FIG. 7 is formed from only one run of memory events among many that could lead to a failure. In order to prove that a cache coherence protocol is correct, every possible run of memory events must be considered for k-nice cycles it may contain. In other words, a graph $G(M,\Omega) = \bigcup_{1 \le i \le n} M(\sigma,i) \bigcup_{1 \le j \le m} \Omega^e(\sigma,j)$ corresponding to every possible run in the system must be checked for nice cycles.

Model Checking

Model Checking is a method of verifying that one or more concurrently operating finite state automata meet a certain specification. For a Model Checker to operate, the finite state automata and the specification to be checked are described in a formal language to the checker. Typically, the finite state machines are defined by a Kripke structure or equivalent and the specification to be checked is described by one or more temporal logic statements. The model checker then exhaustively searches the state space of the finite state automata to determine whether the temporal logic statement is met for all of the runs or not met in one or more of the runs. If the statement is not met, it is customary for the model checker to provide a trace of a run that includes the events that caused the temporal logic statement to not be met.

Figure 9:
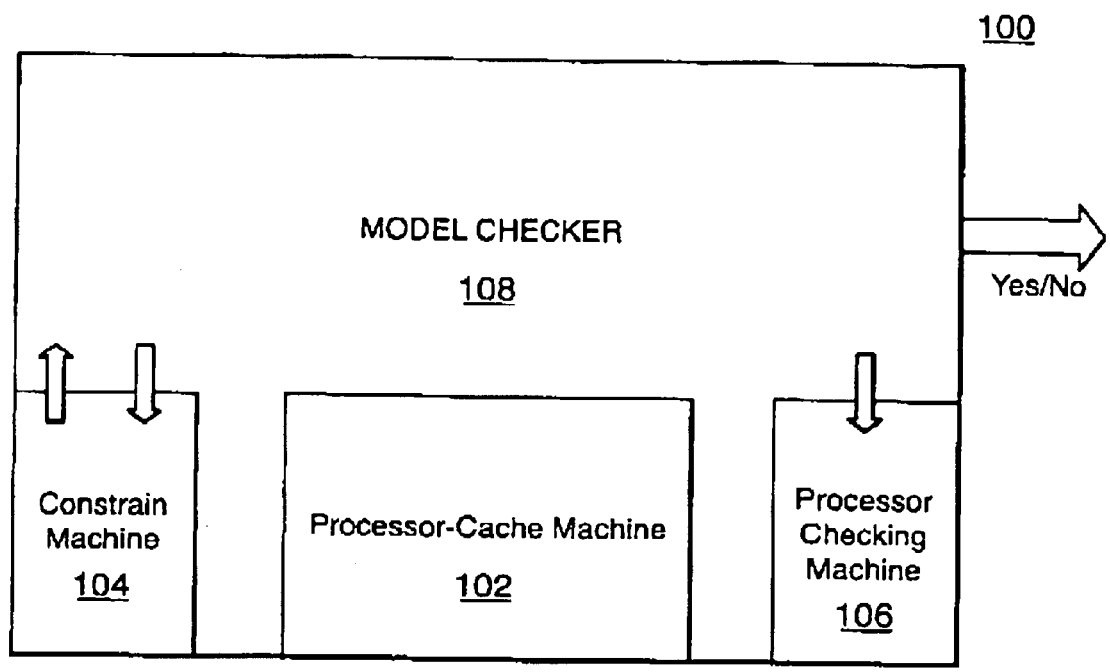
FIG. 9 shows a block diagram of a model checking system by which a protocol automaton is verified.

FIG. 9 shows a block diagram of a model checking system 100 for the present invention. Included are a processor-cache automaton 102, one or more constrain automata 104 and one or more processor checking automata 106. The processor-cache automaton 102 describes, in one embodiment, a particular cache-coherence protocol which is to be checked for sequential consistency. The constrain automata 104 are configured to constrain the state space searched by the model checker to only those states in which a cycle may be present. The processor checking machine detects a cycle in the constrained state space. The Model Checker 108, using these automata 102, 104, 106, produces a yes or no answer indicating whether there is any intersection between the runs of the processor-cache automaton and the runs of the processor checking automata. If the intersection set is a null set, then the processor-cache automaton is correct for all possible runs. If the intersection set is not null, then the processor-cache automaton is incorrect for one or more possible runs.

Cache Coherence Protocol

FIGS. 10A–E show a set of Petri Net diagrams that illustrate a cache coherence protocol for the system of FIG. 1 and FIG. 11 sets forth a formal language statement of the protocol. The cache coherence protocol requires a finite state automaton that operates for each cache line, the state of the automaton being preserved by the state information stored with the line. The events that the coherence automaton supports can change the state information in a line and can involve cache lines in more than one cache. In the particular protocol described by FIGS. 10A–E, there are five different types of events, a READ event, a WRITE event, an ACKS event, an ACKX event and an UPD event.

FIGS. 10A–E describe the effect of each event on the state information by means of a Petri net. A Petri net comprises a set of places, represented by circles, a set of transitions represented by bars, an input function represented by arcs directed from places to transitions, an output function represented by arcs directed from transitions to places and a marking represented by tokens (dots) in the places. The places in the net are holders of state information and the transitions are the events that can happen given a particular marking.

The state of a cache line is captured by the following places: OWNER, SHD, EXC, INV. A processor state (relevant to the protocol) is captured by the PROC place and a R (read) or W (write) place. Each processor has an in queue inQ for receiving update messages. The inQ place for each processor indicates whether a message is present in the in queue for a processor.

Figure 10A:
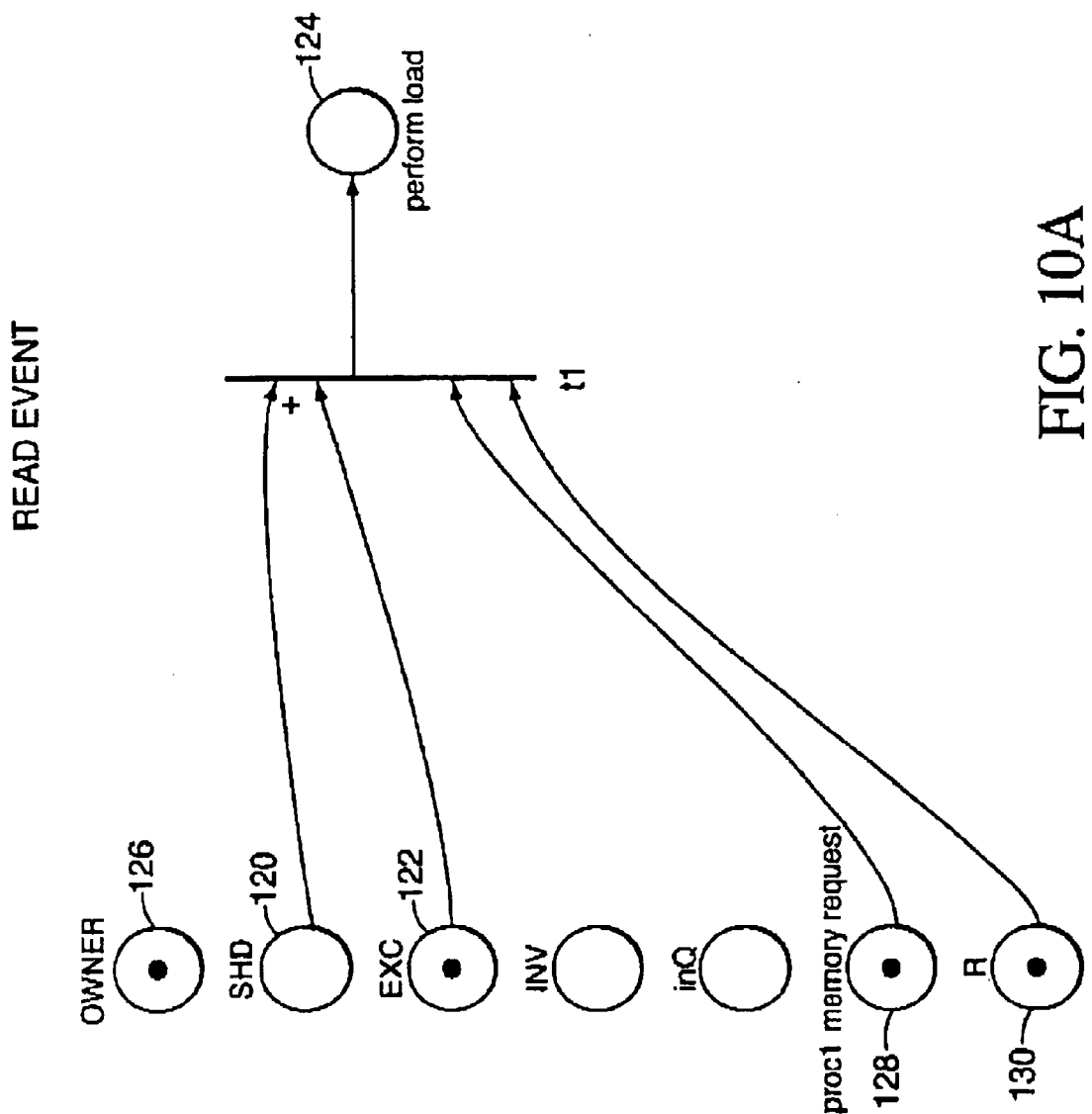
FIGS. 10A–10E illustrate a cache coherence protocol by means of a set of Petri Net diagrams, one for each event in the protocol.

FIG. 10A shows a Read Event. When a processor requests a load of a cache line, indicated by the marking in the prod place 128 and the read place 130 which has the attributes either SHD 120 or EXC 122 (marked), then transition t1 fires and the processor performs a load 124. If a cache line is marked EXC 122, it must also be marked as owned 126 by that cache to be consistent with the UPD event described below.

Figure 10B:
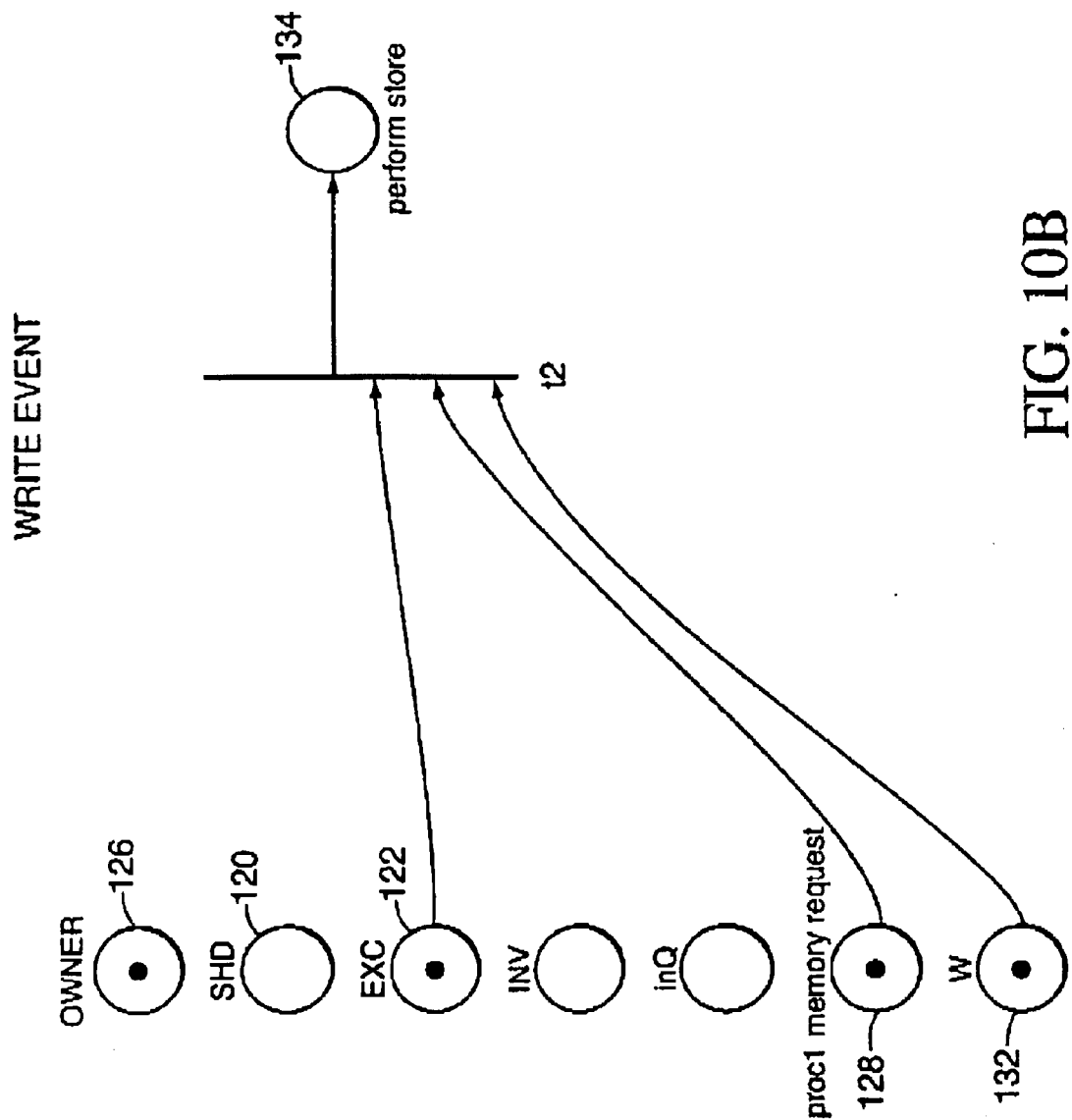

FIG. 10B shows a Write Event. When a processor requests a store to a cache line which is in the EXC state 122, then transition t4 fires and the store, indicated by place 134, is performed by the processor. The cache attributes remain unchanged.

As noted above, the store and load activities depicted in FIG. 10A and FIG. 10B can occur on any of the processors at any time based on the symmetry principle for the processors.

Figure 10C:
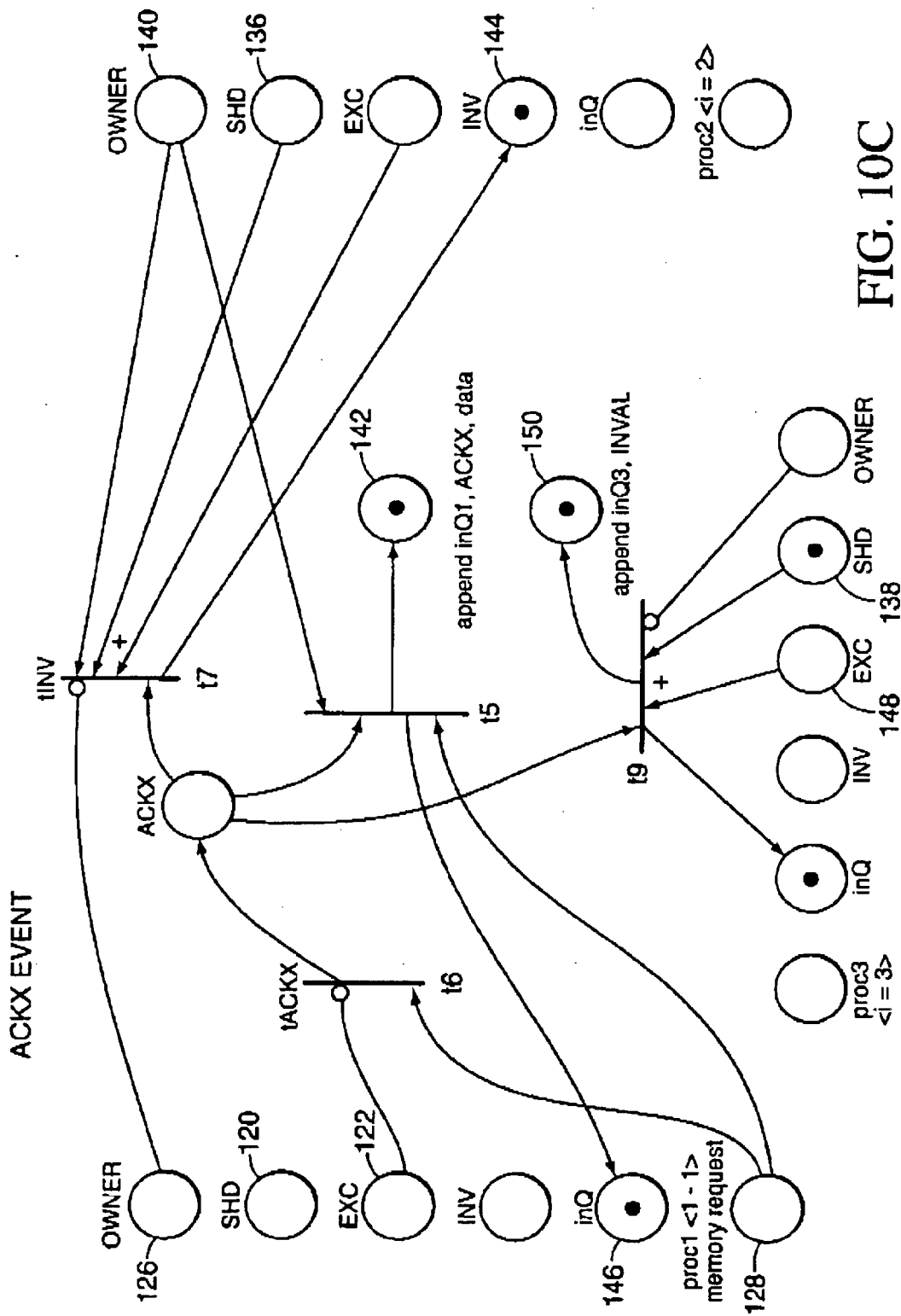

FIG. 10C shows an ACKX event. This event can effect three or more caches. The diagram assumes processor 1 is the requesting processor as indicated by place 128 and the arcs leading therefrom, but any processor could have initiated the event. It also assumes that the lines are in the shared state in the other caches as indicated by places 136, 138 and arcs leading therefrom, processor 2's cache being owner, as indicated by place 140 and arcs leading therefrom, of the shared line. As illustrated, the ACKX event is triggered when processor 1 makes a request to a line that is not in the EXC state in its cache, as indicated by the bubble on the arc connecting the EXC place 122 to transition t6. Once the ACKX event occurs, processor 2's cache, as the owner in the example, then delivers the requested line which is placed in processor 1's inQ as indicated by place 142, when transition t5 fires, along with an <ACKX, j> message. Processor 2's cache line, being in the SHD state, is then invalidated as indicated by place 144 and its ownership of the line is lost, as indicated by place 140. At this point there is no owner of the line, and the data requested by processor 1 is in processor 1's inQ, as indicated by place 146. Because ownership is lost, transition t5 cannot fire again to create another ACKX event for the line until a new owner is established. It will be seen that only the UPD event can establish a new owner. Therefore, at most there is only one ACKX message pending for a particular line. Finally, if another processor, processor 3, had the requested line in either the EXC or SHD in its cache as indicated by places 148, 138, then an <INVAL, j> message is placed in that processor's inQ, inQ3 as indicated by place 150.

Figure 10D:
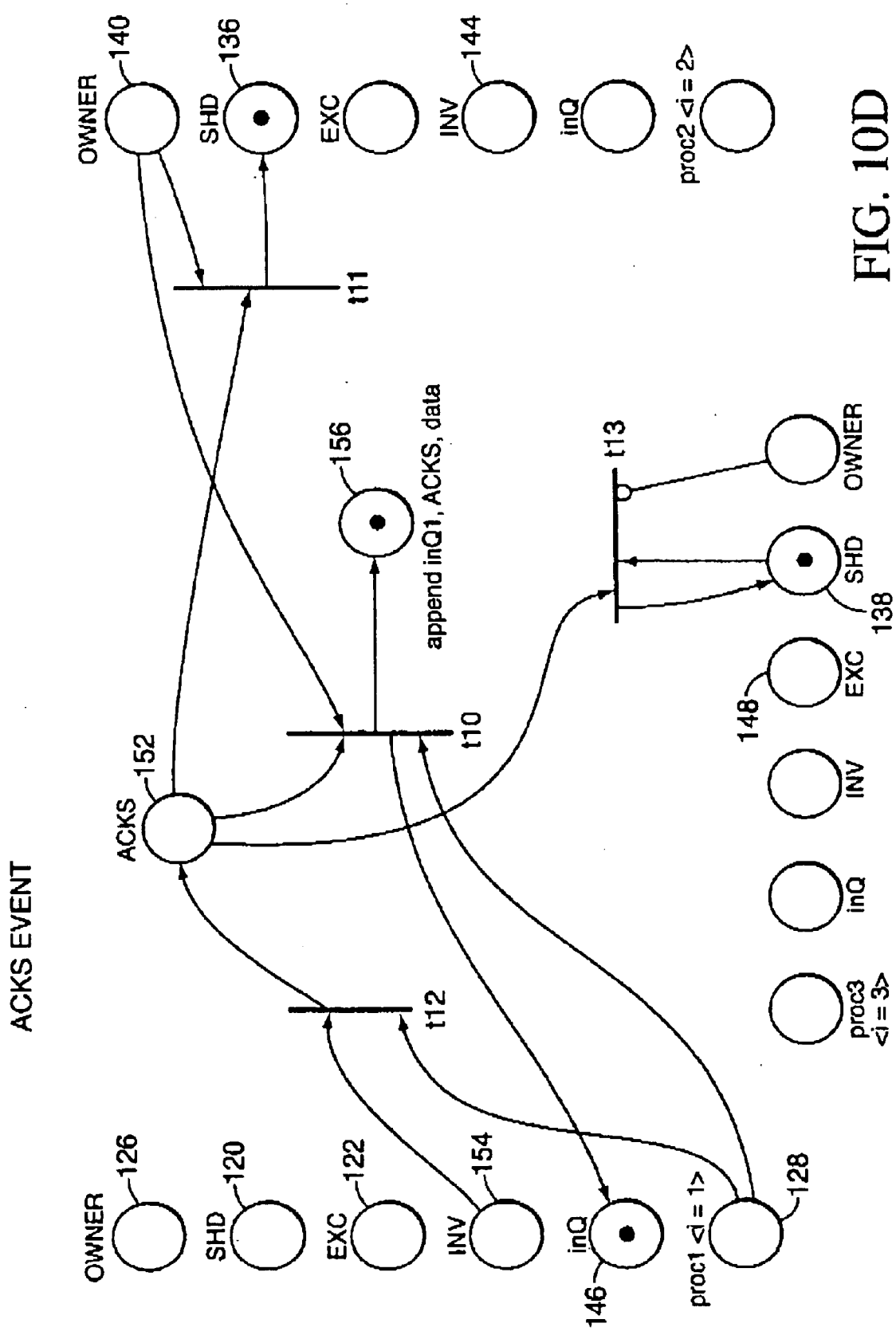

FIG. 10D shows an ACKS event. This event can effect two caches. The ACKS event, as indicated by place 152, is triggered at t12 when a processor, proc1, makes a request, as indicated by place 128, for a cache line which it does not have, as indicated by the INV place 154. The line is obtained from the owner of the cache line, the cache of proc2 in the example as indicated by place 140, and placed into the inQ, as indicated by place 156 of proc1, the requesting processor, along with an <ACKS, j> message. Ownership by proc2 is lost, as indicated by place 140, but the line stays in proc2's cache in the shared state as indicated by place 136. If another processor, proc3 in the example, has the line in the shared state as indicated by place 138, it remains in that state.

Figure 10E:
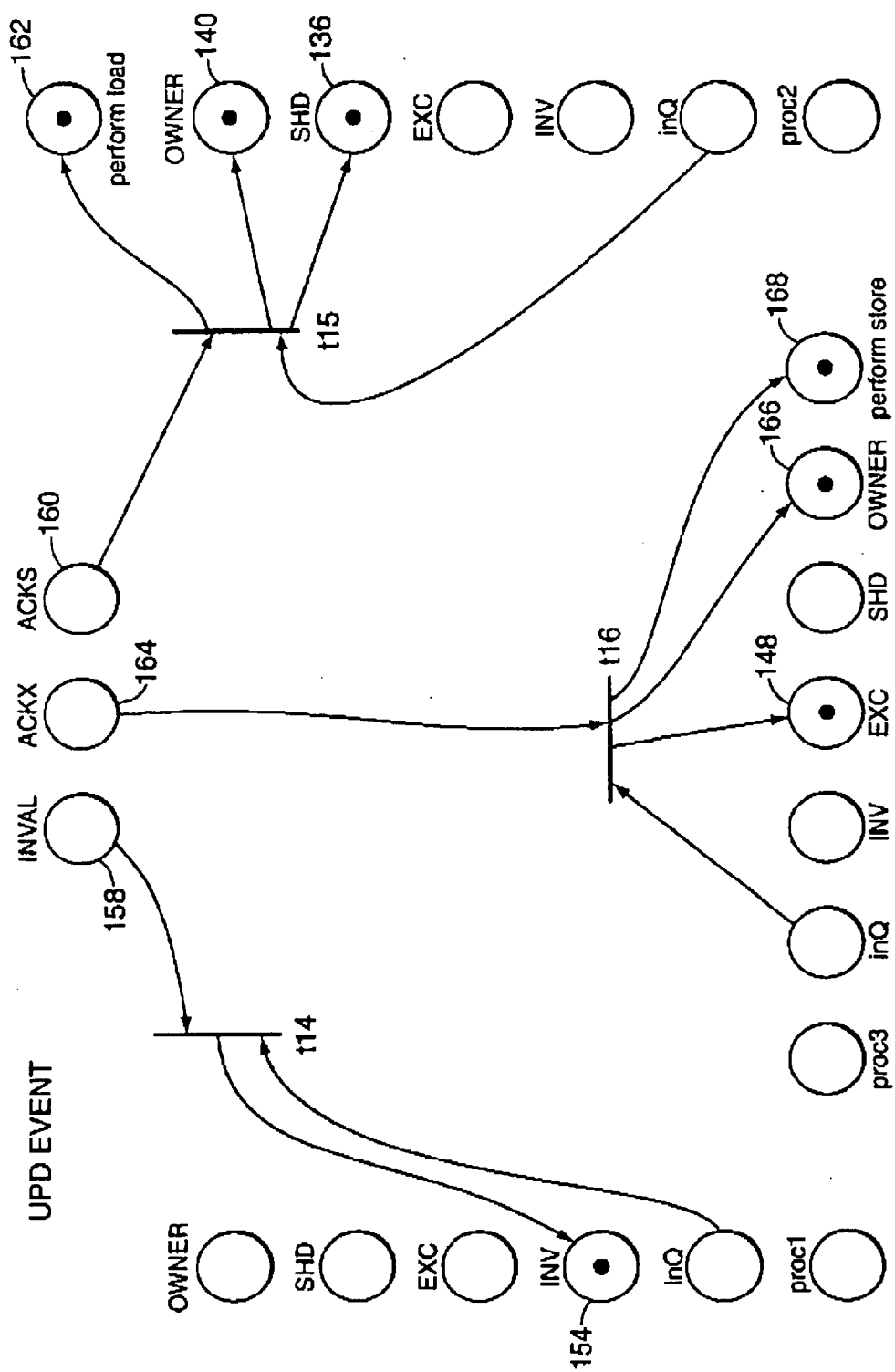

FIG. 10E shows a UPD event. This event completes the processor operation, either a load or store, that caused either ACKX or ACKS messages to be sent on the bus to the various input queues of a processor. There are three different types of messages, INVAL, ACKS, and ACKX.

If proc1, in the example, has an INVAL message in its inQ as indicated by place 158, the cache line in the message is invalidated in proc1's cache, as indicated by place 154.

If proc2, in the example, has an ACKS message in its inQ as indicated by place 160, the cache line in the message is placed in proc2's cache, the line's state is set to SHD and OWNER as indicated by places 136, 140, and the processor completes its load operation as indicated by place 162.

If proc3, in the example, has an ACKX message in its inQ as indicated by place 164, the cache line in the message is placed in proc3's cache, the line's state is set to EXC and OWNER as indicated by places 148, 166 and the processor completes its store operation as indicated by place 168.

FIG. 11 shows a precise language description of the cache protocol that is illustrated in FIGS. 10A–10E. In line 1, a Msg type is defined to include either an ACKS or ACKX message or an INVAL message. An ACKS or ACKX message has the form <ACKS|ACKX, line_id, cache_line_data>. An INVAL message has the form <INVAL, line_id>. Next, a CacheEntry is defined as having the form <cache_line_data, INV|SHD|EXC>. A cache is defined to be a matrix of CacheEntry elements having the form cache[i][j]= CacheEntry, where i is the index over the set of processors, 1 to n, and j is the index over the set of memory locations, 1 to m. An inQ is defined as an array of Queues, one for each processor. An entry in an inQ is a Msg type. Owner is defined as an array of values, one for each memory location. Each entry, owner[j], is either a zero or the index of some processor, the index taking on values between 1 and n.

The cache matrix elements are initialized into the SHD state, with each cache_line_data set to 0. The inQ array elements are initialized to empty and the owner array elements are set to some processor index, so that there is an initial owner processor for each cache line.

A read event <R,i,j,k> occurs when a cache line is not in the INV state and there is a read. The cache_line_data is returned to the processor.

A write event <W,i,j,k> occurs when a cache line is in the EXC state and there is a write. The cache_line_data is received from the processor.

An ACKX event <ACKX,i,j> occurs when a cache line is not in the EXC state and the line has an owner. If the requesting processor, i, is not the owner of the requested line, the owner's cache line is marked INV and the owner of the line is set to 0, meaning that no processor owns the line. The requesting processor then has a message appended to its inQ and the message is an ACKX message with line_id and the cache_line_data. All other processors having the requested line, besides the owner and the requester, will have their line(s) invalidated by receiving an INVAL message in their inQs.

An ACKS event <ACKS,i,j> occurs when a cache line is in the INV state and there is an owner of the cache line. The owner of the line has the line marked as SHD and the owner is then set to 0, to indicate that it is not owned by an processor. An ACKS message is appended to the inQ of the requesting processor with the cache_line_data provided by the owner processor.

An UPD event <UPD,i> occurs when a processor discovers that its inQ is not empty. If the message is an INVAL message, the cache line specified in the message is marked INV. If the message is an ACKS message, the cache line specified in the message is marked SHD and the owner is set to be the requesting processor. If the message is an ACKX message, the cache line specified in the message is marked EXC, and the owner is set to be the requesting processor.

At this point, it is noted that the model checker acts on the above described automaton of FIGS. 10A–10E to cause every possible event to occur in every state of the system. For example, in the initial state, a Read Event, a Write Event, and an ACKX Event can occur. The ACKS event cannot occur because it requires there be a line in the INV state which is contrary to the initial state in which every line is in the SHD state. Also, an UPD event cannot occur because all of the inQs are empty. The model checker terminates when every event for every possible state has occurred. To determine whether the protocol has an error, some global condition that the protocol must meet, usually expressed in a temporal logic statement, is tested during the run of the model checker.

Alternatively, in the present invention, determining whether a graph of the union of the total order of processor events and the partial order of memory event has cycles is equivalent to determining whether the described protocol has an error. However, a model checker does not check graphs for cycles or other characteristics to determine whether the model submitted to the model checker has an error. The present invention provides a way for the model checker, however, to determine the presence of a cycle in the above-mentioned graph.

To determine whether a cycle exists in a graph described above, the model checker is provided with a plurality of facilitating automata which are specially designed to aid in the detection of cycles during the model checker's run through the state space of the protocol automaton. To see how this is accomplished, a description of these facilitating automata is first presented.

Figure 12A:
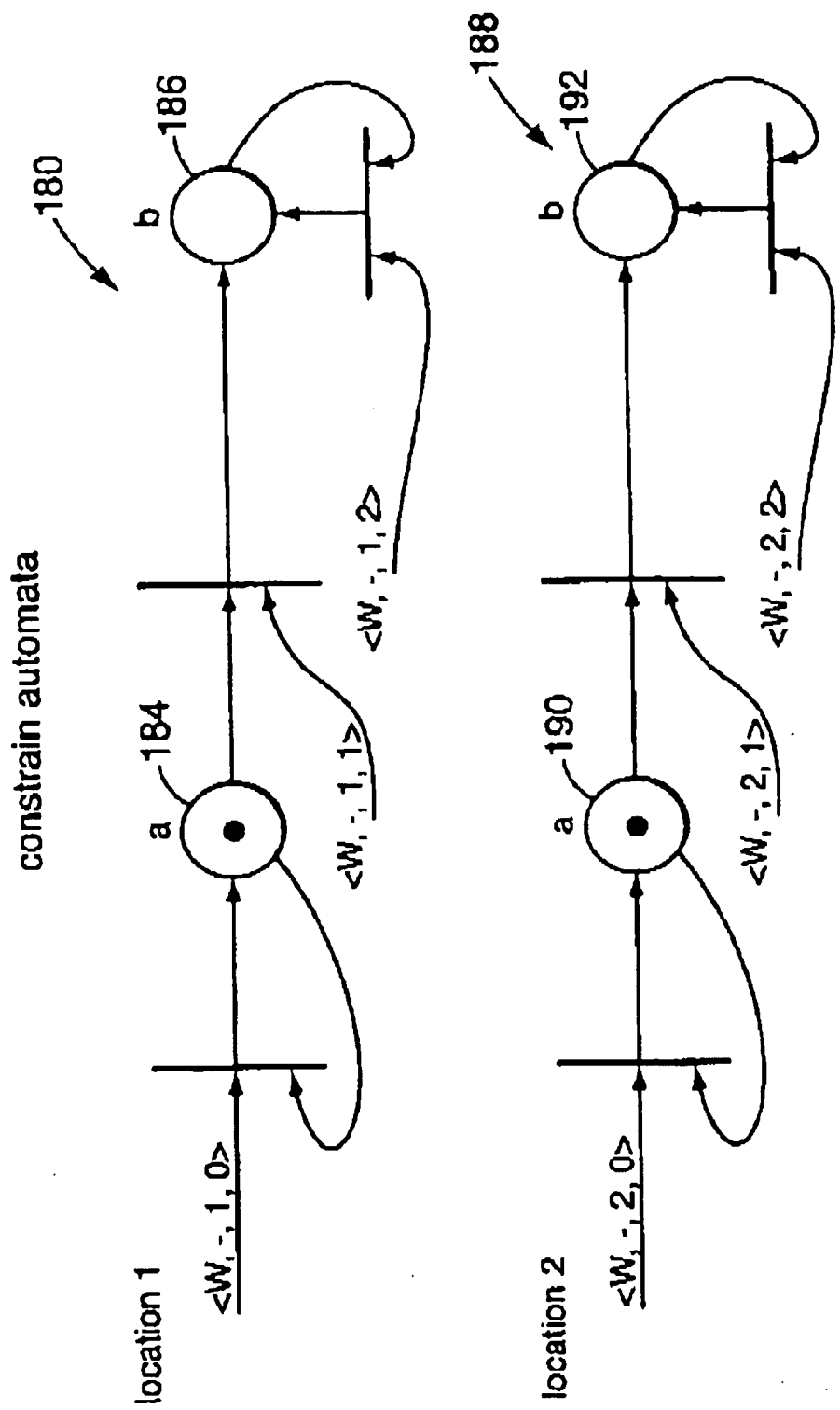
FIG. 12A shows a plurality of constrain automata for the canonical 2-nice cycle shown in FIG. 8B.
Figure 12B:
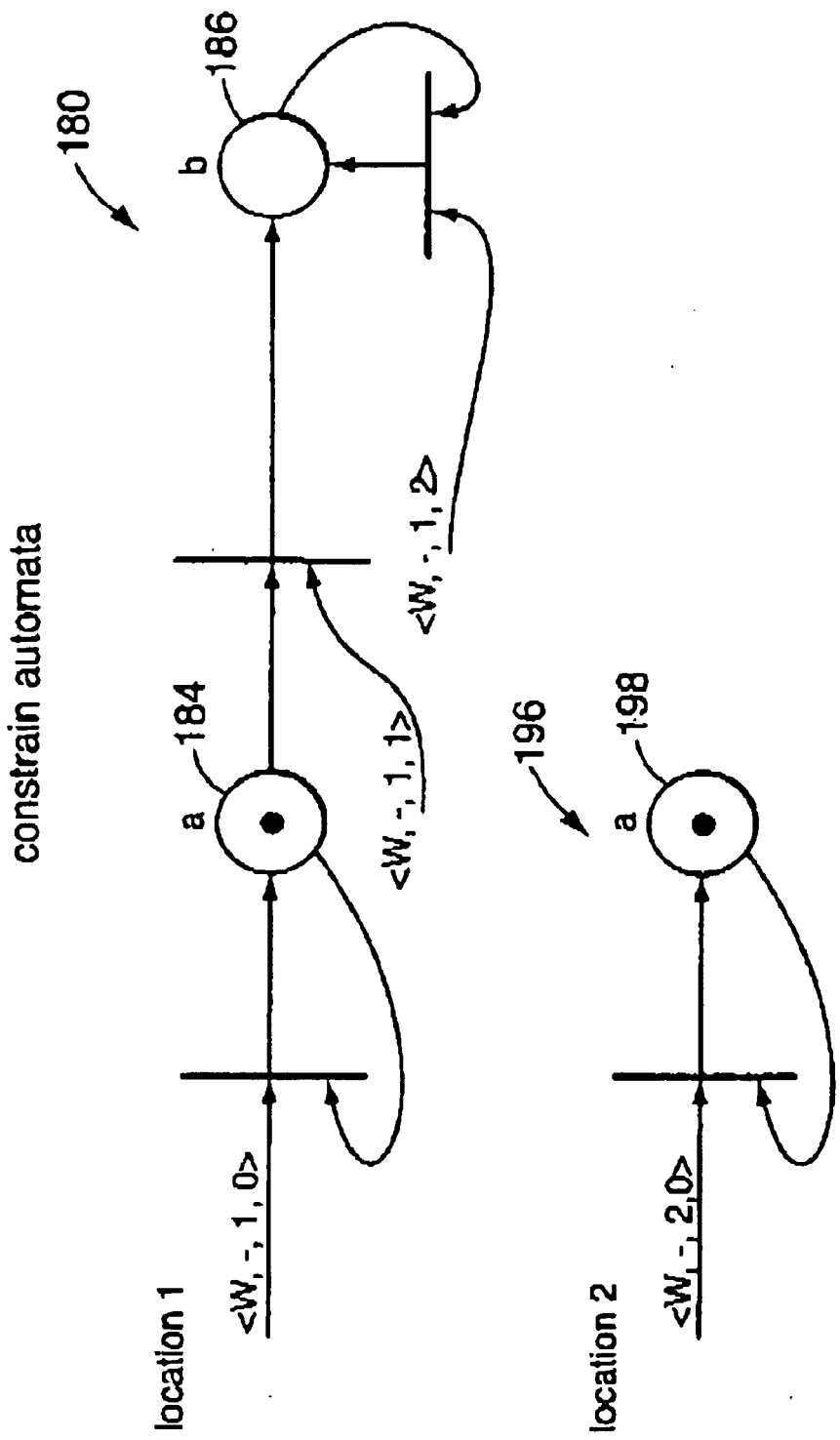
FIG. 12B show a plurality of constrain automata for a canonical 1-nice cycle.
Figure 12C:
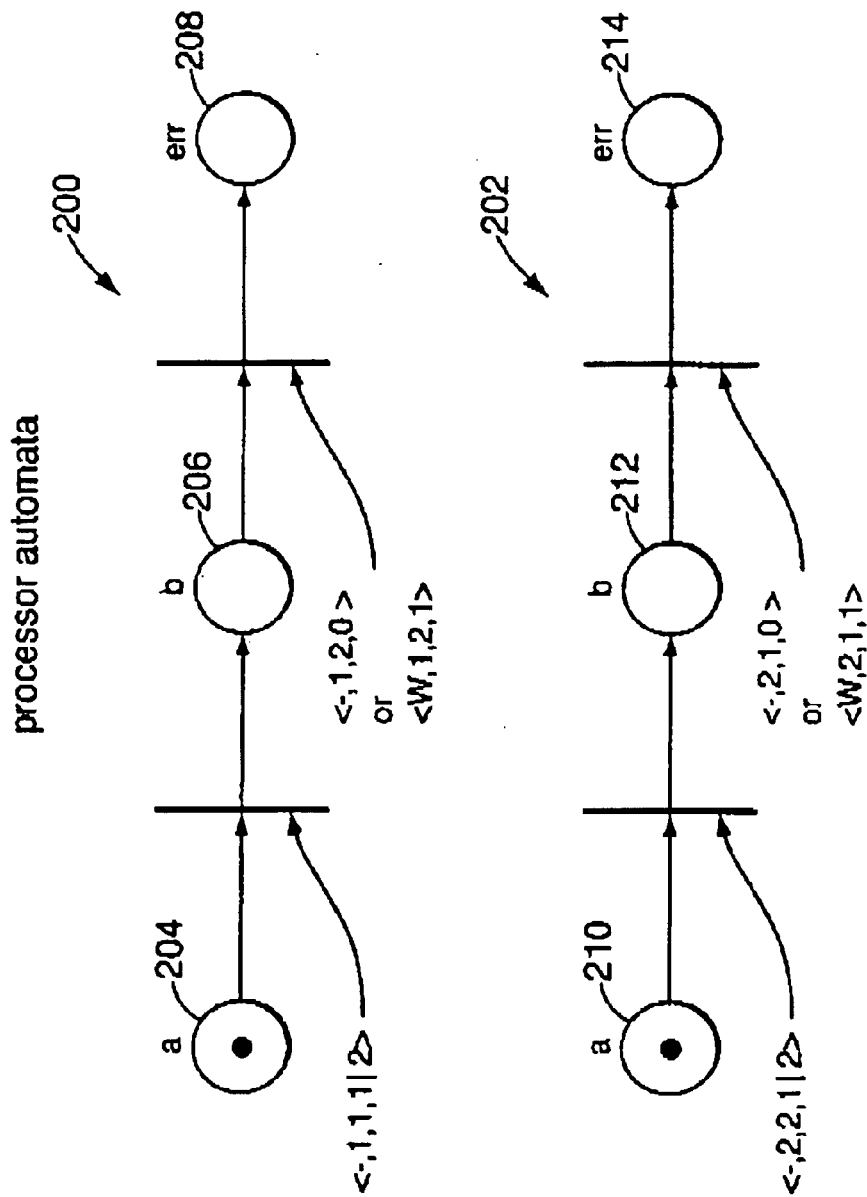
FIG. 12C shows a plurality of processor checking automata for the canonical 2-nice cycle of FIG. 8B.

The automata are shown in FIG. 12A, FIG. 12B and FIG. 12C. FIGS. 12A and 12B show the memory constrain automata. When testing for a canonical 2-nice cycle, there are two of these automata, one for each memory location.

The first of these machines 180 is initialized to state "a", place 184, and "ignores" events that are not writes to location 1, which means that if an event that is not a write to location 1 occurs, the machine stays in whatever state it is currently in. The machine 180 stays in state "a", place 184, when a write to location 1 with a zero <W,−,1,0> occurs by any processor. State "b", place 186, is reached when a write to location 1 with a data value of 1, <W,−,1,1>, occurs by any processor and maintained when a write to location 1 with a data value of 2, <W,−,1,2>, occurs by any processor. Thus, the first of these machines 180 accepts the sequence $(<W,-,1,0>)_h \rightarrow <W,-,1,1> \rightarrow (<W,-1,2>)_h$, where his a non-negative integer. In a similar manner, the second of these machines 188 accepts the sequence $(<W,-,2,0>)_h \rightarrow <W,-,2,1> \rightarrow (<W,-2,2>)_h$, with its states "a" 190 and "b" 188.

When testing for a canonical 1-nice cycle there are two constrain automata. FIG. 12B shows the constrain automata for the case of a 1-nice cycle. The first constrain automata 196 is similar to the location 1 constrain automata shown in FIG. 12A. However, the second constrain automata 196, for location 2, is different. This machine has only one state "a", place 198, which is also the initial state, and ignores events that are not writes to location 2. The machine 196 accepts a run if there is a write to location 2 with a zero data value, i.e., when <W,−,2,0> events occur, assuming that a 1-nice cycle is being detected. The constrain automata of FIG. 12A or FIG. 12B constrain or limit the state space that the model checker must consider.

In general, if the number of memory locations is greater than the size of the nice cycle being detected, there is one constrain machine such as the first machine is FIG. 12B for each memory location up to and including the size of the nice cycle. For the other memory locations up to m, there are machines similar to the second machine in FIG. 12B which accept runs as long as there is a write to the particular machine's memory location with a zero data value.

FIG. 12C shows the processor checking automata 200, 202. There are two of these machines when testing for a canonical 2-nice cycle. The first of these machines 200 involves the tracking of processor 1. The machine starts in state "a" 204 and when any operation occurs by processor 1 that involves a data value of 1 or 2 at location 1 <−,1,1,1|2>, the machine reaches state "b" 206. In state "b" 206, if either processor 1 accesses a 0 at location 2, that is event <−1,1, 2,0> occurs, or processor 1 writes a 1 to location 2, <W,1, 2,1>, then the "err" state 208 is reached. Thus, the machine accepts the sequence <−,1,1,1|2>→<−,1,2,0> or the sequence <−,1,1,1|2>→<W,1,2,1>.

The second of these machines 202 involves processor 2. The machine starts in state "a" 210, and when any operation occurs by processor 2 that involves a data value of 1 or 2 at location 2, <−,2,2,1|2>, state "b" 212 is reached. If processor 2 accesses a 0 at location 1, that is event <−,2,1,0> occurs, or writes a 1 to location 1, <W,2,1,1>, then the "err" state 214 is reached. Thus, the machine accepts the sequence <−,2,2,1|2>→<−,2,1,0> or the sequence <−,2,2,1|2>→<W, 2,1,1>. Both processor checking automata must reach their "err" states during a run of the model checker with the state space constrained by the constrain machines of FIG. 12A to detect the canonical 2-nice cycle.

FIG. 13A is a language statement of the constrain automata and FIG. 13B is a language statement of the processor checking automata. One type of $constrain_k(j)$ automaton is defined for values of j between 1 and k inclusive, where k is the size of the nice cycle being detected. The other type of automaton is defined for values of j between k+1 and m inclusive, where m is the number of memory locations.

Under the Transitions heading of the first type of automaton, Constrain(j) for $1 \leq j \leq k$, are four transition terms. The machine starts in state "a". The first transition term causes the machine to maintain its current state, if a write to location j does not occur. The second transition term is enabled in state "a" and causes the machine to maintain state "a" if there is a write to location j with a data value of 0. The third transition term is enabled in state "a" and causes the machine to reach state "b" if there is a write to location j with a data value of 1. The fourth transition term is enabled in state "b" and causes state "b" to be maintained if there is a write to location j with data value of 2.

The second type of constrain automaton, Constrain(j) for $(k+1) \leq j \leq m$, for locations whose index is greater than the size of the nice-cycle being detected, is initialized to state "a". The machine ignores events that are not writes to location j according to the first transition term and accepts runs if a write to location j with a zero data value occurs according to the second transition term.

FIG. 13B is a language statement of the processor checking automata. According to the transitions section, if a processor i accesses location i with data which is either 1 or 2, then the machine transitions from state "a" to state "b". If processor i then accesses location i+1 modulo k, with a data value of 0 or with a write and data value equal to 1, then the machine enters state "err" from state "b". There is one machine for processor 1 and another for processor 2.

When the facilitating automata are provided to the model checker, the condition to be checked is whether each processor checking automata reach its "err" state during a run constrained by the constrain machines and configured to test for a give size cycle. If so, a cycle has been detected in the graph G, and there is an error in the protocol.

Keeping with the example presented herein, the following is a sequence of events that leads to a cycle and to erroneous data because there is an error in the protocol. The error is assumed to be that after an ACKS event, the owner of the relevant line is not temporarily set to zero, thereby preventing additional ACKS or ACKX events to that line. The events are set forth in the chart below.

|   | Event | proc 3 states | | | proc 2 states | | |
|---|---|---|---|---|---|---|---|
|   |   | inQ | loc2 | loc1 | inQ | loc2 | loc1 |
| 1. | <ACKX,3,2> | <ACKX,2> | ¬EXC | SHD | <INVAL,2> | SHD | SHD |
| 2. | <UPD,3> |  | EXC, OWN | SHD |  | INV |  |
| 3. | <ACKS,2,2> | <ACKS,2> | SHD, OWN |  | <ACKS,2> | INV |  |
| 4. | <ACKX,3,2> | <ACKX,2> |  |  |  | INV |  |

-continued

| | | proc 3 states | | | proc 2 states | | |
| | Event | inQ | loc2 | loc1 | inQ | loc2 | loc1 |
|---|---|---|---|---|---|---|---|
| 5. | <ACKX,2,1> | <INVAL,1> | | | <ACKX,1> | | |
| 6. | <UPD,2> | | | | | SHD | |
| 7. | <UPD,2> | | | | | | EXC |
| 8. | <W,2,1,1> | | | | | | d = 1 |
| 9. | <R,2,2,0> | | | | d = 0 | | |
| 10. | <UPD,3> | | EXC | SHD | | | |
| 11. | <W,3,2,1> | | d = 1 | | | | |
| 12. | <R,3,1,0> | | | d = 0 | | | |

Events 1 and 2 establish that processor 3 has location 2 in the EXC state. Next, in event 3 an <ACKS,2,2> event occurs in which there is an error in the protocol because ownership is not taken from processor 3. Processor 3's cache correctly changes the line to SHD but retains the OWNER attribute. However, ownership of the line should be temporarily set to zero to prevent additional ACKS or ACKX events to that line. After event 3, processor 2 has an <ACKS, 2> message in its inQ, but the line is still in the INV state in processor 2's cache, having been invalidated by the <INVAL,2> in event 1.

Next, event 4 occurs. This event should not be possible in this state because there should be no ownership of the line in location 2, until the update for event 3 occurs. However, event 4 does occur because of the error. This event lodges an <ACKX,2> message in processor 3's inQ and but does not enqueue an <INVAL,2> message in processor 2's inQ because processor 2's location 2 is already in the INV state.

Next, event 5 occurs in which processor 2 performs an <ACKX,2,1> event to obtain the location 1 line in the EXC state. An <ACKX,1> message is placed in processor 2's inQ and an <INVAL,1> message is placed in processor 3's inQ.

Events 5 and 6 perform updates to processor 2. First the <ACKS,2> message is processed, being first in the inQ. This causes location 2 to be in the SHD state. Next, the <ACKX, 1> state is processed, causing location 1 to be in the EXC state. However, location 2 is in the SHD state because of the error. It should be in the INV state.

Next event 8 writes location 1 of processor 2's cache with a 1 and event 9 reads location 2 of processor 2's cache. The read returns a zero, which is an error, because the location is set to SHD rather than INV and zero is the initial value.

Event 10 now updates processor 3's cache at location 2 to the EXC state because an <ACKX,2> message is in its inQ. Location 1 of processor 3's cache is still in the SHD state, the initial state, because an update for location 1 has not been performed.

In event 11, processor 3 writes a 1 to location 2 and in event 12 processor 3 reads a 0 from location 1, which is an error, because location 1 of processor 3's cache should be in the INV state.

Now it is clear that the error in the protocol, that the <ACKS,2,2> failed to remove ownership of line 2 in processor 3's cache, led to the erroneous reads. It is also clear that the read and write events form a 2-nice cycle, i.e., <W,2,1,1>, <R,2,2,0>, <W,3,2,1>, <R,3,1,0>, as illustrated in FIG. 8. It is clear that this 2-nice cycle, when converted to a canonical 2-nice cycle, is detected by the processor checking automata.

Figure 14:
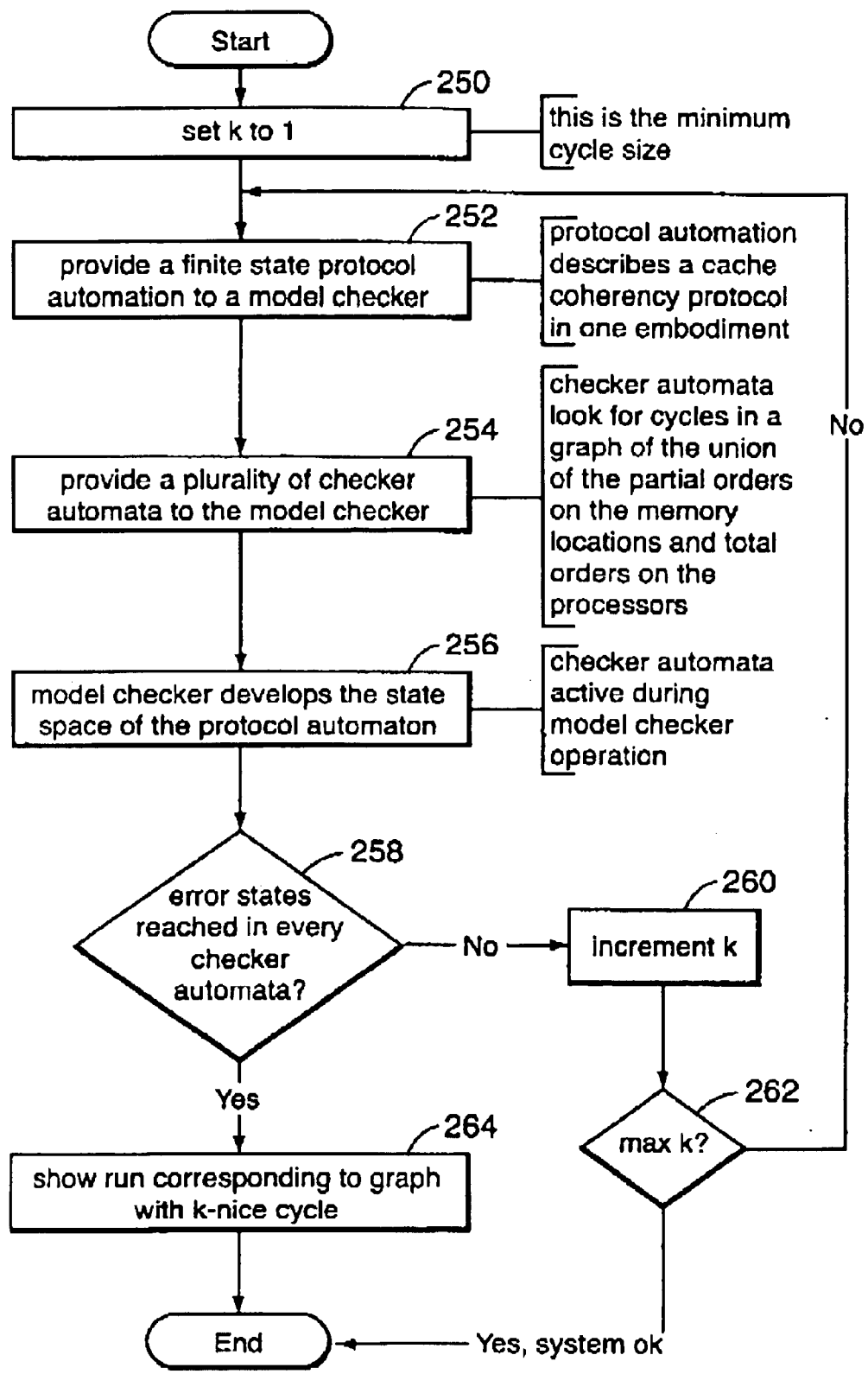
FIG. 14 shows a flow chart of the overall process of proving that the system of FIG. 1 with caches and the coherence protocol that they require does not lead to errors in the system.

FIG. 14 sets forth the steps of the present invention in a flow chart. First, in step 250, a parameter k is initialized to 1, the minimum size of a cycle. Next, in step 252, a finite state protocol automaton is provided to the model checker. This protocol automaton describes, in one embodiment, a cache coherence protocol. A plurality of checker automata are also provided to the model checker, in step 254. These checker automata are configured to detect a cycle of size k. The model checker then runs to develop the state space of the protocol automaton, in step 256, and, during the running of the model checker, the checker automata are active to check for cycles of size k, in step 258. If error states are not reached in every processor checker machine, as determined in step 258, the parameter k is incremented, in step 260, and if k is not yet its maximum value, as determined in step 262, another run takes place with the model checker to detect cycles of size k+1. This continues until k is at its maximum, as determined in step 262. If no cycles have been found by the checker automata, then the protocol is error free. If a cycle has been found, as determined in step 258, a trace of the run having the k-sized cycle is shown, in step 264.

Thus, the combination of the exhaustive testing by the model checker and the facilitating automata guarantees that a given size cycle will either be found or not found. If a run of the model checker is made for each possible cycle size, and the result is that not all of the facilitating automata reach their error states then there is no error in the protocol.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of verifying, for a computing system having a plurality of processors and a memory having a plurality of locations being shared by each of the plurality of processors, a protocol for sequential consistency, comprising:

provide an executable description of an automaton for the protocol to be verified;

providing an executable description of at least one constrain automaton;

providing an executable description of at least one processor checking automaton, said at least one processor checking automaton having an error state and being configured to detect the presence of a cycle of a given size in a graph that is a union of partial orderings of memory events at the shared memory locations and of total orderings of the memory events at the processors, a cycle being present in the graph if the error state is reached in said at least one processor checking automaton;

submitting the protocol automaton, said at least one processor checking automaton and said at least one constrain automaton to a model checker;

running the model checker to reach a set of states of the protocol automaton that are permitted by said at least one constrain automaton;

during the running of the model checker, determining whether said at least one processor checker automaton has reached its error state; and if said at least one processor checker automaton has reached its error state, providing an indication that there is a sequential consistency error in the protocol automaton.

2. A method of verifying a protocol for sequential consistency as recited in claim 1, wherein each processor in the system has a cache and the protocol is a cache coherency protocol.

3. A method of verifying a protocol for sequential consistency as recited in claim 1, wherein there are a plurality of m locations in the shared memory and there are a plurality of n processors; and wherein the step of providing executable descriptions of a plurality of finite state automata includes providing a number of processor checking automata to check for a cycle of a given size, the number being between 1 and the smaller of either n or m.

4. A method of verifying a protocol for sequential consistency as recited in claim 1, wherein there are a plurality m locations in the shared memory and there are a plurality n processors; and wherein the size of a cycle equals k, where k is between 1 and the smaller of n or m.

5. A method of verifying a protocol for sequential consistency as recited in claim 1, wherein the number of memory events in a cycle is equal to 2k, where k is equal to n or m, whichever is smaller;

wherein there are m constrain automata; and wherein there are k processor checker automata and each accepts 2 memory events of the cycle.

6. A method of verifying a protocol for sequential consistency as recited in claim 1, wherein there are two memory locations and three processors;

wherein the number of memory events in a cycle is equal to 4, where k is equal to 2;

wherein there are two constrain automata; and wherein there are two processor checker automata and each accepts 2 memory events of the cycle.

7. A method of verifying a protocol for sequential consistency as recited in claim 6, wherein the two constrain automata have similar descriptions.

8. A method of verifying a protocol for sequential consistency as recited in claim 1, wherein there are two memory locations and three processors;

wherein the number of memory events in a cycle is equal to 2, where k is equal to 1;

wherein there are two constrain automata; and wherein there is one processor checker automaton and each accepts 2 memory events of the cycle.

9. A method of verifying a protocol for sequential consistency as recited in claim 8, wherein the two constrain automata have different descriptions.

10. A method of verifying a protocol for sequential consistency as recited in claim 1, wherein if said at least one processor checker automaton has reached its error state, providing a trace that includes events that caused the sequential consistency error.

* * * * *

UNITED STATES PATENT AND TRADEMARK OFFICE
CERTIFICATE OF CORRECTION

PATENT NO. : 6,892,319 B2
APPLICATION NO. : 09/949324
DATED : May 10, 2005
INVENTOR(S) : Shaz Qadeer Page 1 of 1

It is certified that error appears in the above-identified patent and that said Letters Patent is hereby corrected as shown below:

In column 6, line 8, after "presented," insert -- there are --, therefor.

In column 8, line 38, delete "prod" and insert -- proc 1 --, therefor.

In column 11, lines 44-45, delete "<-1,1,2,0>" and insert -- <-,1,2,0> --, therefor.

Signed and Sealed this

Twenty-fifth Day of August, 2009

David J. Kappos
*Director of the United States Patent and Trademark Office*